US009360958B2

(12) United States Patent
Kurokawa

(10) Patent No.: US 9,360,958 B2
(45) Date of Patent: Jun. 7, 2016

(54) SEMICONDUCTOR INTEGRATED CIRCUIT DEVICE, DISPLAY DEVICE AND INFORMATION TECHNOLOGY DEVICE

(71) Applicant: Synaptics Display Devices GK, Tokyo (JP)

(72) Inventor: Yasuhito Kurokawa, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 0 days.

(21) Appl. No.: 14/464,868

(22) Filed: Aug. 21, 2014

(65) Prior Publication Data

US 2015/0054765 A1 Feb. 26, 2015

(30) Foreign Application Priority Data

Aug. 22, 2013 (JP) .................................. 2013-171897

(51) Int. Cl.
*G06F 3/041* (2006.01)
*G06F 1/32* (2006.01)
*G06F 3/044* (2006.01)

(52) U.S. Cl.
CPC ............ *G06F 3/0412* (2013.01); *G06F 1/3262* (2013.01); *G06F 3/0416* (2013.01); *G06F 3/044* (2013.01)

(58) Field of Classification Search
CPC ................................ G06F 3/041–3/047; G06F 2203/04101–2203/04113
USPC .......... 345/173–178; 178/18.01–18.09, 18.11
See application file for complete search history.

(56) References Cited

U.S. PATENT DOCUMENTS

| 8,952,870 | B2* | 2/2015 | Matsumoto | ........... | G06F 3/0488 178/18.01 |
| 2009/0174679 | A1* | 7/2009 | Westerman | ......... | G06F 3/03547 345/173 |
| 2010/0103136 | A1* | 4/2010 | Ono | ...................... | G06F 3/0488 345/173 |
| 2010/0129068 | A1* | 5/2010 | Binda | ................ | H04N 5/23293 396/50 |
| 2014/0232653 | A1* | 8/2014 | Yagihashi | ............. | G06F 3/0416 345/158 |

FOREIGN PATENT DOCUMENTS

| JP | 2004-102911 A | 4/2004 |
| JP | 2012-256153 A | 12/2012 |
| JP | 2013-065293 A | 4/2013 |

* cited by examiner

*Primary Examiner* — Stephen Sherman
(74) *Attorney, Agent, or Firm* — Miles & Stockbridge P.C.

(57) ABSTRACT

A display device is arranged so as to be able to conduct a touch detection action for sensing a region where a touch operation on a touch panel has been performed, to stop the touch detection action in the touch panel, and to specify a touch-detection-stop region. The display device includes an image-display-direction register. A processor writes parameters designating an image-display direction into the image-display-direction register based on a result of detection by a tilt detector. On condition that parameters stored in the image-display-direction register have been changed, the display device changes the touch-detection-stop region based on the parameters. The above function is mounted on a semiconductor integrated circuit device included in the display device.

29 Claims, 14 Drawing Sheets

Fig.10

| TX No. | RANGE OF COORDINATES |
|---|---|
| TX1 | $0 \sim \frac{Y}{8} - 1$ |
| TX2 | $\frac{Y}{8} \sim \frac{2Y}{8} - 1$ |
| TX3 | $\frac{2Y}{8} \sim \frac{3Y}{8} - 1$ |
| TX4 | $\frac{3Y}{8} \sim \frac{4Y}{8} - 1$ |
| TX5 | $\frac{4Y}{8} \sim \frac{5Y}{8} - 1$ |
| TX6 | $\frac{5Y}{8} \sim \frac{6Y}{8} - 1$ |
| TX7 | $\frac{6Y}{8} \sim \frac{7Y}{8} - 1$ |
| TX8 | $\frac{7Y}{8} \sim Y$ |

| RX No. | RANGE OF COORDINATES |
|---|---|
| RX1 | $0 \sim \frac{X}{10} - 1$ |
| RX2 | $\frac{X}{10} \sim \frac{2X}{10} - 1$ |
| RX3 | $\frac{2X}{10} \sim \frac{3X}{10} - 1$ |
| RX4 | $\frac{3X}{10} \sim \frac{4X}{10} - 1$ |
| RX5 | $\frac{4X}{10} \sim \frac{5X}{10} - 1$ |
| RX6 | $\frac{5X}{10} \sim \frac{6X}{10} - 1$ |
| RX7 | $\frac{6X}{10} \sim \frac{7X}{10} - 1$ |
| RX8 | $\frac{7X}{10} \sim \frac{8X}{10} - 1$ |
| RX9 | $\frac{8X}{10} \sim \frac{9X}{10} - 1$ |
| RX10 | $\frac{9X}{10} \sim X$ |

Fig.11

| REGISTER NAME | CONTENT | - |
|---|---|---|
| TASX | TOUCH-DETECTION-TARGETED-REGION-START-POINT-DESIGNATING REGISTER (X DIRECTION) | Touch Area Start –X |
| TASY | TOUCH-DETECTION-TARGETED-REGION-START-POINT-DESIGNATING REGISTER (Y DIRECTION) | Touch Area Start –Y |
| TAEX | TOUCH-DETECTION-TARGETED-REGION-END-POINT-DESIGNATING REGISTER (X DIRECTION) | Touch Area End –X |
| TAEY | TOUCH-DETECTION-TARGETED-REGION-END-POINT-DESIGNATING REGISTER (Y DIRECTION) | Touch Area End –Y |
| IASX | IMAGE-DATA-REGION-START-POINT-DESIGNATING REGISTER (X DIRECTION) | Image Area Start -X |
| IASY | IMAGE-DATA-REGION-START-POINT-DESIGNATING REGISTER (Y DIRECTION) | Image Area Start –Y |
| IAEX | IMAGE-DATA-REGION-END-POINT-DESIGNATING REGISTER (X DIRECTION) | Image Area End –X |
| IAEY | IMAGE-DATA-REGION-END-POINT-DESIGNATING REGISTER (Y DIRECTION) | Image Area End –Y |
| DIRX | IMAGE-DATA-DISPLAY-DIRECTION-SETTING REGISTER (X DIRECTION) | DIRection –X |
| DIRY | IMAGE-DATA-DISPLAY-DIRECTION-SETTING REGISTER | DIRection –Y |
| PSTE | POWER-SAVING-TOUCH-MODE-ENABLE REGISTER | Power Saving Touch mode Enable |

Fig.16
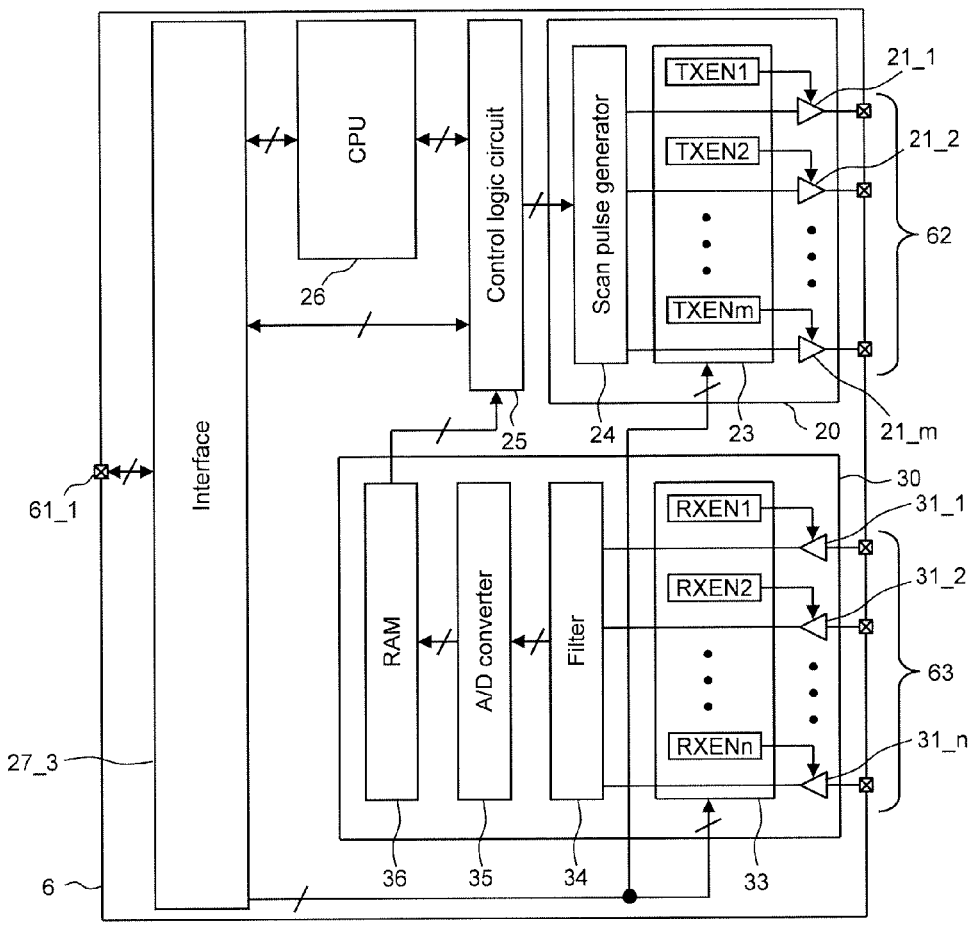
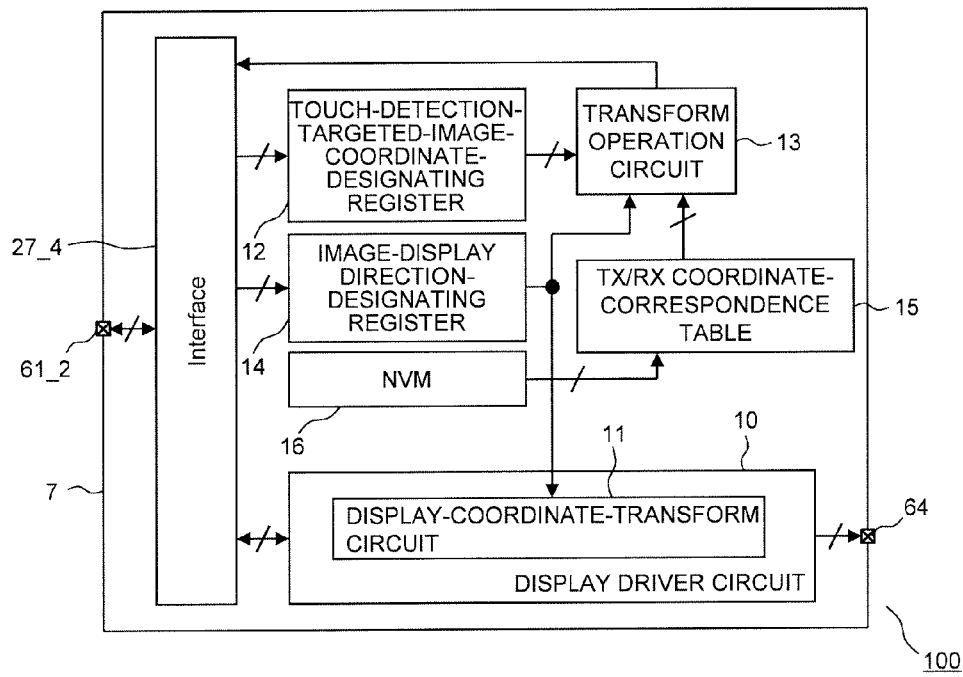

SEMICONDUCTOR INTEGRATED CIRCUIT DEVICE, DISPLAY DEVICE AND INFORMATION TECHNOLOGY DEVICE

CROSS-REFERENCE TO RELATED APPLICATIONS

The Present application claims priority from Japanese application JP 2013-171897 filed on Aug. 22, 2013, the content of which is hereby incorporated by reference into this application.

BACKGROUND

The present invention relates to a semiconductor integrated circuit device, a display device and an information technology device, which can be utilized suitably for a control circuit of a touch sensor provided on a display screen thereof particularly.

Information technology devices including a smart phone and other portable devices each having a touch sensor provided on a display screen and a display device and arranged so that information can be input thereto by a user touching the display screen have been in widespread use. A display device included in such an information technology device has e.g. a liquid crystal display (LCD: Liquid Crystal Display) panel and touch sensing functionality formed together according to an in-cell or on-cell form, or the like, and is controlled and driven by a display drive IC (Integrated Circuit) and a touch control IC, or a semiconductor integrated circuit device (IC) of one chip which a display drive IC and a touch control IC are integrated into. These ICs are connected with an application processor by communication paths of MIPI/DSI (Mobile Industry Processor Interface/Display Serial Interface), I2C (Inter-Integrated Circuit), and the like, and send and receive display data, touch detection information, other control command status information.

The Japanese Unexamined Patent Application Publication No. JP-A-2013-65293 discloses a device which includes: a touch screen display having a display and a touch screen; a sensor for detecting a tilt of the device; and a controller for changing the orientation of the screen of the display according to the detection by the sensor. The controller has the function of changing the orientation of the screen according to the gesture that a user performs on a touch screen and therefore, it can make an image displayed on the screen easier to watch for the user.

JP-A-2012-256153 discloses a terminal device having a touch panel-equipped liquid crystal display which enables the enhancement of the operability without a user operation. In the terminal device, the hand by which the user holds the device is inferred by detecting the tilt of the terminal device and further, predicts a region easier to input according to the hand by which the user holds the device and then displays a software keyboard in the region.

JP-A-2004-102911 discloses a technique for suppressing the decline of control responsiveness in a display device with a touch panel, which is arranged so that the frequency level of detecting a press action can be set for each display screen region.

The inventor examined the patent documents, JP-A-2013-65293, JP-A-2012-256153 and JP-A-2004-102911 prior to the present invention.

SUMMARY

From the examination on JP-A-2013-65293, JP-A-2012-256153 and JP-A-2004-102911, the inventor found a new problem as described below.

As to information technology devices including portable devices, it is always a critical problem to reduce power consumption. This applies to a portable device having a display device with a touch sensor provided on a display screen. With such device, there is a remarkable tendency for a display panel to have a larger screen size and a higher resolution. The technique described in JP-A-2004-102911 can be expected to reduce the power consumption by keeping low the frequency level of detecting a touch operation on a region which is not necessary to detect touch operation on because the frequency level of the detection can be set for each region of a display screen.

Some of information technology devices like this have the function of sensing the orientation which a user has such a device toward and then changing its displayed-image orientation according to the orientation like devices according to the techniques described in JP-A-2013-65293 and JP-A-2012-256153. In the information technology devices as described in JP-A-2013-65293 and JP-A-2012-256153, a processor such as the controller as described in JP-A-2013-65293 determines an appropriate display orientation and recalculates display data based on information from a sensor which detects the tilt of the device, thereby changing the orientation of display. As to a device having such a function, in order to reduce the power consumption in combination with a technique as described above for keeping low the frequency level of the detection on a region which is not necessary to detect touch on, it is required to perform the procedure including: recalculating and changing a region to lower the frequency level of the detection on according to the orientation in which the device is grasped, and changing the setting of the device. However, the recalculation by a processor has not only the problem of causing the responsiveness to decline with an increase in the amount of calculation, but also the problem of increasing the power consumption.

Therefore, it is an objective of the invention to keep low the power consumption of a display device and that of an entire information technology device when changing a display region according to the tilt of the device in the information technology device including the display device with a touch panel provided on a display panel, a sensor for detecting the tilt of the device and a processor. Also, it is an objective of the invention to provide a touch control IC which is mounted on the display device, and controls the touch panel and performs a touch detection, and which enables the achievement of the above objective of the invention with a display device with the touch control IC mounted thereon and an information technology device as described above.

The means for resolving these problems will be described below. The other problems and novel features will become apparent from the description hereof and the accompanying drawings.

According to an embodiment of the invention, an information technology device is arranged as follows.

The information technology device includes: a display device having a touch function provided on the display panel; a tilt detector for detecting a tilt; and a processor. The display device is arranged to be able to conduct a touch detection action for sensing a region where a touch operation on a touch panel has been performed, and to designate, in the touch panel, a touch-detection-stop region to stop the touch detection action on. The display device includes an image-display-direction register, and a processor writes parameters designating an image-display direction into the image-display-direction register based on a result of detection by the tilt detector. In case that parameters stored in the image-display-direction register are changed, the display device changes the touch-detection-stop region based on the parameters. A touch control IC is formed as a semiconductor integrated circuit having the functions as described above, and incorporated in the display device.

The effect which the above embodiment brings about is briefly as follows.

That is, the power consumption of a display device and that of an entire information technology device can be kept low. This is because the touch-detection-stop region is changed with the change in the display region when changing a image-display orientation according to the tilt of the information technology device.

BRIEF DESCRIPTION OF THE DRAWINGS

FIG. 10 is an explanatory diagram for explaining a correspondence table between TX/RX and coordinates;

FIG. 11 is a table for configuration of the touch-detection-targeted-image-coordinate-designating register, the image-data-region-designating register, and the image-display-direction register;

FIG. 16 is a block diagram showing the other example of the configuration in which the touch control IC and the display driver IC are arranged in separate chips.

DETAILED DESCRIPTION

1. Summary of the Embodiments

Figure 1:
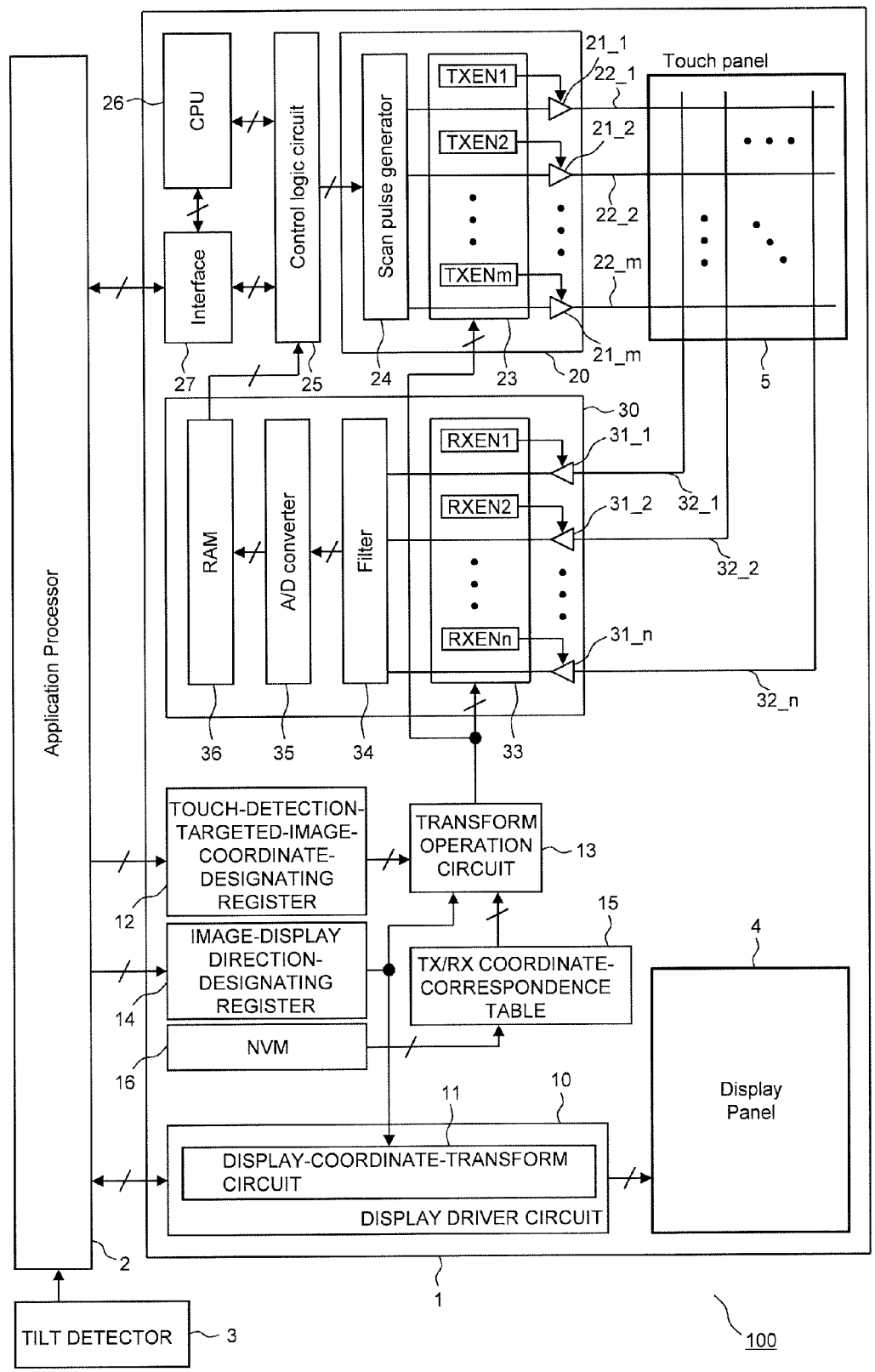
FIG. 1 is a block diagram showing the configuration of a display device and an information technology device according to an embodiment of the invention.

First, summary of representative embodiments of the invention disclosed in the application will be described. Reference numerals in drawings in parentheses referred to in description of the summary of the representative embodiments just denote components included in the concept of the components to which the reference numerals are designated.

[1]<Touch Control IC that Changes the Touch-Sense-Stop Region Based on the Image-Display Orientation>

The semiconductor integrated circuit device (6, 8) can be incorporated in a display device (1) incorporated in an information technology device (100) including a processor (2) to be connected with a tilt detector (3) for detecting a tilt, and having a display panel (4) and a touch panel (5) superposed on the display panel. The semiconductor integrated circuit device is arranged as follows.

The semiconductor integrated circuit device is arranged to be able to perform a touch detection action for sensing a region where a touch operation on the touch panel has been performed, and arranged to be able to designate a touch-detection-stop region to stop the touch detection action in the touch panel.

The semiconductor integrated circuit device includes an image-display-direction register (14). The image-display-direction register is arranged so that the processor can write parameters designating an image-display direction calculated based on a result of the detection by the tilt detector thereinto. The semiconductor integrated circuit device further includes a conversion operation circuit (13) which changes the touch-detection-stop region based on contents stored in the image-display-direction register on condition that the parameters stored in the image-display-direction register have been changed.

According to this embodiment, in the case of changing a display orientation according to the tilt of an information technology device having the semiconductor integrated circuit device incorporated therein, the touch-detection-stop region is changed with the change in the display region and thus, the power consumption by the display device can be kept low.

[2]<Display Drive Circuit for Converting Display Coordinates on Chip>

The semiconductor integrated circuit device as described in [1] is arranged to be able to receive a series of display data from the processor, and to display an image on the display panel based on the series of display data thus received (e.g. the display driver circuit 10). The semiconductor integrated circuit device further includes: a display-coordinate-conversion circuit (11) which changes, based on contents stored in the image-display-direction register, coordinates of an image to be displayed on the display panel on condition that the parameters stored in the image-display-direction register have been changed.

According to this embodiment, in the case of changing the display orientation according to the tilt of the information technology device having the semiconductor integrated circuit device incorporated therein, the conversion of coordinates of a touch-detection-stop orientation, and the conversion of coordinates where an image is to be displayed are performed in parallel with the change of the display region. Consequently, the response to the change in the tilt can be speeded up.

[3]<TX/RX Enable Registers>

In the semiconductor integrated circuit device as described in [1] or [2], the touch panel includes: a plurality of touch-drive lines (22_1 to 22_m); and a plurality of touch-sense lines (32_1 to 32_n) intersecting with the plurality of touch-drive lines (where m and n are each positive integer).

The semiconductor integrated circuit device has: a plurality of touch-drive circuits (21_1 to 21_m) for driving the plurality of touch-drive lines respectively; a plurality of touch-sense circuits (31_1 to 31_n) connected with the plurality of touch-sense lines respectively; a touch-drive-enable register (23); and a touch-sense enable register (33). The semiconductor integrated circuit device is arranged to be able to perform control for stopping the plurality of touch-drive circuits from working based on values set on the touch-drive-enable register respectively, and arranged to be able to perform control for stopping the plurality of touch-sense circuits from working based on values set on the touch-sense enable register respectively.

According to this embodiment, the fine settings can be performed on the touch-detection-stop region.

[4]<Coordinate-Correspondence Table of Display Coordinates and Touch-Drive/Sense Lines>

The semiconductor integrated circuit device as described in [3] further includes: a coordinate-correspondence table (15) for associating, with coordinates of an image to be displayed on the display panel, physical positions of the plurality of touch-drive lines and physical positions of the plurality of touch-sense lines respectively. The conversion operation circuit makes reference to the coordinate-correspondence table, and performs setting on the touch-drive-enable register and the touch-sense enable register corresponding to the touch-detection-stop region.

According to this embodiment, the touch-drive circuit to stop from working and the touch-sense circuit to stop from working can be derived from display coordinates of an image readily.

[5]<NVM (Non Volatile Memory) which Stores the Coordinate-Correspondence Table>

The semiconductor integrated circuit device as described in [4], further includes a non-volatile memory (NVM, 16) capable of storing the coordinate-correspondence table.

According to this embodiment, a coordinate-correspondence table adapted to the structures of the touch panel and the display panel to be incorporated can be written into the non-volatile memory in the display device and therefore, the coordinate-correspondence table can be adapted to wide varieties of touch panels and display panels.

[6]<Registers for Designating Start and End Points of a Touch-Detection-Stop Region>

The semiconductor integrated circuit device as described in [1] includes: a register (12) for designating start and end points of the touch-detection-stop region.

According to this embodiment, the processor can designate a touch-detection-stop region with a small amount of data transmission.

[7]<Registers for Designating Start and End Points of Touch-Detection-Stop Regions>

The semiconductor integrated circuit device as described in [6] includes: a plurality of registers (12) for designating start and end points of the touch-detection-stop regions.

According to this embodiment, even in the case of designating a plurality of touch-detection-stop regions, the processor can designate the touch-detection-stop regions with a small amount of data transmission.

[8]<Intermittent Action of RX-Filter-ADC (Analog to Digital Converter)>

The semiconductor integrated circuit device as described in [3] further includes a filter circuit (34) connected with outputs of the plurality of touch-sense circuits, and an A/D converter (35) connected with an output of the filter circuit, and is arranged to be able to perform control for intermittently activating the filter circuit and the A/D converter based on values set on the touch-sense enable register.

According to this embodiment, the power consumption can be reduced further.

[9]<Operating Frequency of CPU (Central Processing Unit)>

The semiconductor integrated circuit device as described in [8] further includes a memory (36) capable of storing an output of the A/D converter, and a CPU (26) connected with the memory to be able to make access thereto, and is arranged to be able to perform control for changing the operating frequency of the CPU based on values set on the touch-sense enable register.

According to this embodiment, the power consumption can be reduced further.

[10]<TX/RX Enable Registers and Increase in TX Frequency>

The semiconductor integrated circuit device as described in [3] is arranged so that while more than one touch-drive circuit is stopped from working based on values set on the touch-drive-enable register, control for increasing the frequency of activating the remaining touch-drive circuits can be performed.

According to this embodiment, the sensitivity of sense on a region to perform a touch sense (touch detection) on other than the touch-detection-stop region can be increased.

[11]<Display Device which Changes the Touch-Sense-Stop Region Based on the Image-Display Orientation>

A display device (1) can be incorporated in an information technology device (100) including a processor (2) to be connected with a tilt detector (3) for detecting a tilt, has a display panel (4), and a touch panel (5) superposed on the display panel, and is arranged as follows.

The display device is arranged to be able to perform a touch detection action for sensing a region where a touch operation on the touch panel has been performed, and arranged to be able to designate a touch-detection-stop region to stop the touch detection action on the touch panel.

The display device includes an image-display-direction register (14). The image-display-direction register is arranged so that the processor can write parameters designating an image-display direction calculated based on a result of the detection by the tilt detector thereinto. The display device includes: a conversion operation circuit (13) which changes the touch-detection-stop region based on contents stored in the image-display-direction register on condition that the parameters stored in the image-display-direction register have been changed.

According to this embodiment, in the case of changing the display orientation according to the tilt of an information technology device in which the display device is incorporated, the touch-detection-stop region is changed with a change in the display orientation and as such, the power consumption of the display device can be reduced.

[12]<Conversion of Display Coordinates>

The display device as described in [11] is arranged to be able to receive a series of display data from the processor, and to display an image on the display panel based on the series of display data thus received (e.g. display driver circuit 10). The display device further includes: a display-coordinate-conversion circuit (11) which changes, based on contents stored in the image-display-direction register, coordinates of an image to be displayed on the display panel on condition that the parameters stored in the image-display-direction register have been changed.

According to this embodiment, in the case of changing the display orientation according to the tilt of the information technology device having the semiconductor integrated circuit device incorporated therein, the conversion of coordinates of a touch-detection-stop region, and the conversion of coordinates where an image is to be displayed are performed in parallel with the change of the display orientation. Consequently, the response to the change in the tilt can be fast.

[13]<TX/RX Enable Registers>

In the display device as described in [11] or [12], the touch panel includes a plurality of touch-drive lines ($22\_1$ to $22\_m$), and a plurality of touch-sense lines ($32\_1$ to $32\_n$) intersecting with the plurality of touch-drive lines. The display device has: a plurality of touch-drive circuits ($21\_1$ to $21\_m$) for driving the plurality of touch-drive lines respectively; a plurality of touch-sense circuits ($31\_1$ to $31\_n$) connected with the plurality of touch-sense lines respectively; a touch-drive-enable register (23); and a touch-sense enable register (33). The display device is arranged to be able to perform control for individually stopping the plurality of touch-drive circuits from working based on the touch-drive-enable register, and arranged to be able to perform control for individually stopping the plurality of touch-sense circuits from working based on the touch-sense enable register.

According to this embodiment, the fine settings can be performed on the touch-detection-stop region.

[14]<Coordinate-Correspondence Table of Display Coordinates and Touch-Drive/Sense Lines>

The display device as described in [13] further includes: a coordinate-correspondence table (15) for associating, with coordinates of an image to be displayed on the display panel, physical positions of the plurality of touch-drive lines and physical positions of the plurality of touch-sense lines respectively. The conversion operation circuit makes reference to the coordinate-correspondence table, and performs setting on the touch-drive-enable register and the touch-sense enable register corresponding to the touch-detection-stop region.

According to this embodiment, the touch-drive circuit to stop from working and the touch-sense circuit to stop from working can be derived from display coordinates of an image readily.

[15]<NVM that Stores the Coordinate-Correspondence Table>

The display device as described in [14] includes: a non-volatile memory (NVM, 16) capable of storing the coordinate-correspondence table.

According to this embodiment, a coordinate-correspondence table adapted to the structures of the touch panel and the display panel to be incorporated can be written into the non-volatile memory in the display device and therefore, the coordinate-correspondence table can be adapted to wide varieties of touch panels and display panels.

[16]<Register which Designates Start and End Points of the Touch-Detection-Stop Region>

The display device as described in [11] includes a register (12) for designating start and end points of the touch-detection-stop region.

According to this embodiment, the processor can designate the touch-detection-stop region with a small amount of data transmission.

[17]<Registers for Designating Start and End Points of Touch-Detection-Stop Regions>

The display device as described in [16] includes: a plurality of registers (12) for designating start and end points of the touch-detection-stop regions.

According to this embodiment, even in the case of designating a plurality of touch-detection-stop regions, the processor can designate the touch-detection-stop regions with a small amount of data transmission.

[18]<TX/RX Enable Registers and Increase in TX Frequency>

The display device as described in [13] is arranged so that while more than one touch-drive circuit is stopped from working based on values set on the touch-drive-enable register, control for increasing the frequency of activating the remaining touch-drive circuits can be performed.

According to this embodiment, the sensitivity of sense on a region to perform a touch sense (touch detection) on other than the touch-detection-stop region can be increased.

[19]<Information Technology Device which Changes the Touch-Sense-Stop Region Based on the Image-Display Orientation>

An information technology device (100) includes: a display device (1) including a display panel (4) and a touch panel (5) provided on the display panel; a tilt detector (3) for detecting a tilt; and a processor (2), and the information technology device is arranged as follows.

The display device is arranged to be able to perform a touch detection action for sensing a region where a touch operation on the touch panel has been performed, and arranged to be able to designate a touch-detection-stop region to stop the touch detection action in the touch panel. The display device includes: an image-display-direction register (14). The processor is arranged to be able to write parameters designating an image-display direction into the image-display-direction register based on a result of the detection by the tilt detector. The display device includes a conversion operation circuit (13) which changes the touch-detection-stop region based on contents stored in the image-display-direction register on condition that the parameters stored in the image-display-direction register have been changed.

According to this embodiment, in the case of changing the display orientation according to the tilt of an information technology device, the touch-detection-stop region is changed with a change in the display orientation and as such, the power consumption of the display device and that of the entire information technology device can be reduced.

[20]<Conversion of Display Coordinates>

In the information technology device as described in [19], the display device is arranged to be able to receive a series of display data from the processor, and to display an image on the display panel based on the series of display data thus received (e.g. display driver circuit 10). The display device further includes: a display-coordinate-conversion-operation circuit (11) which changes, based on contents stored in the image-display-direction register, coordinates of an image to be displayed on the display panel on condition that the parameters stored in the image-display-direction register have been changed.

According to this embodiment, in the case of changing the display orientation according to the tilt of the information technology device, the conversion of coordinates of a touch-detection-stop region, and the conversion of coordinates where an image is to be displayed are performed in parallel with the change of the display orientation. Consequently, the response to the change in the tilt can be fast.

[21]<TX/RX Enable Registers>

In the information technology device as described in [19] or [20], the touch panel includes: a plurality of touch-drive lines ($22\_1$ to $22\_m$); and a plurality of touch-sense lines ($32\_1$ to $32\_n$) intersecting with the plurality of touch-drive lines.

The display device has: a plurality of touch-drive circuits ($21\_1$ to $21\_m$) for driving the plurality of touch-drive lines respectively; a plurality of touch-sense circuits ($31\_1$ to 31_n) connected with the plurality of touch-sense lines respectively; a touch-drive-enable register (23); and a touch-sense enable register (33).

The display device is arranged to be able to perform control for individually stopping the plurality of touch-drive circuits from working based on the touch-drive-enable register, and arranged to be able to perform control for individually stopping the plurality of touch-sense circuits from working based on the touch-sense enable register.

According to this embodiment, the fine settings can be performed on the touch-detection-stop region.

[22]<Coordinate-Correspondence Table of Display Coordinates and Touch-Drive/Sense Lines>

The information technology device as described in [21], the display device further includes: a coordinate-correspondence table (15) for associating, with coordinates of an image to be displayed on the display panel, physical positions of the plurality of touch-drive lines and physical positions of the plurality of touch-sense lines respectively. The conversion operation circuit makes reference to the coordinate-correspondence table, and performs setting on the touch-drive-enable register and the touch-sense enable register corresponding to the touch-detection-stop region.

According to this embodiment, the touch-drive circuit to stop from working and the touch-sense circuit to stop from working can be derived from display coordinates of an image readily.

[23]<NVM which Stores the Coordinate-Correspondence Table>

In the information technology device as described in [22], the display device includes a non-volatile memory (NVM, 16) which can store the coordinate-correspondence table.

According to this embodiment, a coordinate-correspondence table adapted to the structures of the touch panel and the display panel to be incorporated can be written into the non-volatile memory in the display device and therefore, the coordinate-correspondence table can be adapted to wide varieties of touch panels and display panels.

[24]<Register which Designates Start and End Points of the Touch-Detection-Stop Region>

In the information technology device as described in [19], the display device includes a register (12) for designating start and end points of the touch-detection-stop region.

According to this embodiment, the processor can designate the touch-detection-stop region with a small communication volume.

[25]<Registers for Designating Start and End Points of Touch-Detection-Stop Regions>

In the information technology device as described in [24], the display device includes a plurality of registers (12) for designating start and end points of the touch-detection-stop regions.

According to this embodiment, even in the case of designating touch-detection-stop regions, the processor can designate the touch-detection-stop regions with a small communication volume.

[26]<TX/RX Enable Register and Increase in TX Frequency>

The information technology device as described in [21] is arranged so that while more than one touch-drive circuit is stopped from working based on values set on the touch-drive-enable register, control for increasing the frequency of activating the remaining touch-drive circuits can be performed.

According to this embodiment, the sensitivity of sense on a region to perform a touch sense (touch detection) on other than the touch-detection-stop region can be increased.

2. Further Detailed Description of the Embodiments

The embodiments will be described further in detail.

First Embodiment

Display Device which Changes a Touch-Sense-Stop Region Based on an Image-Display Orientation FIG. 1 is a block diagram showing the configuration of a display device 1 and an information technology device 100 according to an embodiment of the invention. The information technology device 100 includes: the display device 1, a tilt detector 3 for detecting the tilt; and an application processor 2.

The display device 1 is arranged so as to be able to perform a touch detection action for sensing a region where a touch operation has been performed on the touch panel 5, and to specify a touch-detection-stop region to stop the touch detection action in the touch panel 5. The display device 1 includes an image-display-direction register 14. The application processor 2 is capable of writing parameters designating an image-display direction into the image-display-direction register 14 based on a result of detection by the tilt detector 3. The display device 1 includes a conversion operation circuit 13; on condition that parameters stored in the image-display-direction register 14 have been changed, the conversion operation circuit changes a touch-detection-stop region based on contents stored in the image-display-direction register 14.

According to the arrangement like this, in the case of changing the display region according to the tilt of the information technology device 100, the touch-detection-stop region will be changed with the change of the display region. As a result, the power consumption of the display device 1 and that of the entire information technology device 100 can be kept low. The reason for this is if the touch-detection-stop region is not changed with the change in the display region, a touch sensing would be conducted on the full screen, which makes impossible to suppress the power consumption.

Figure 2:
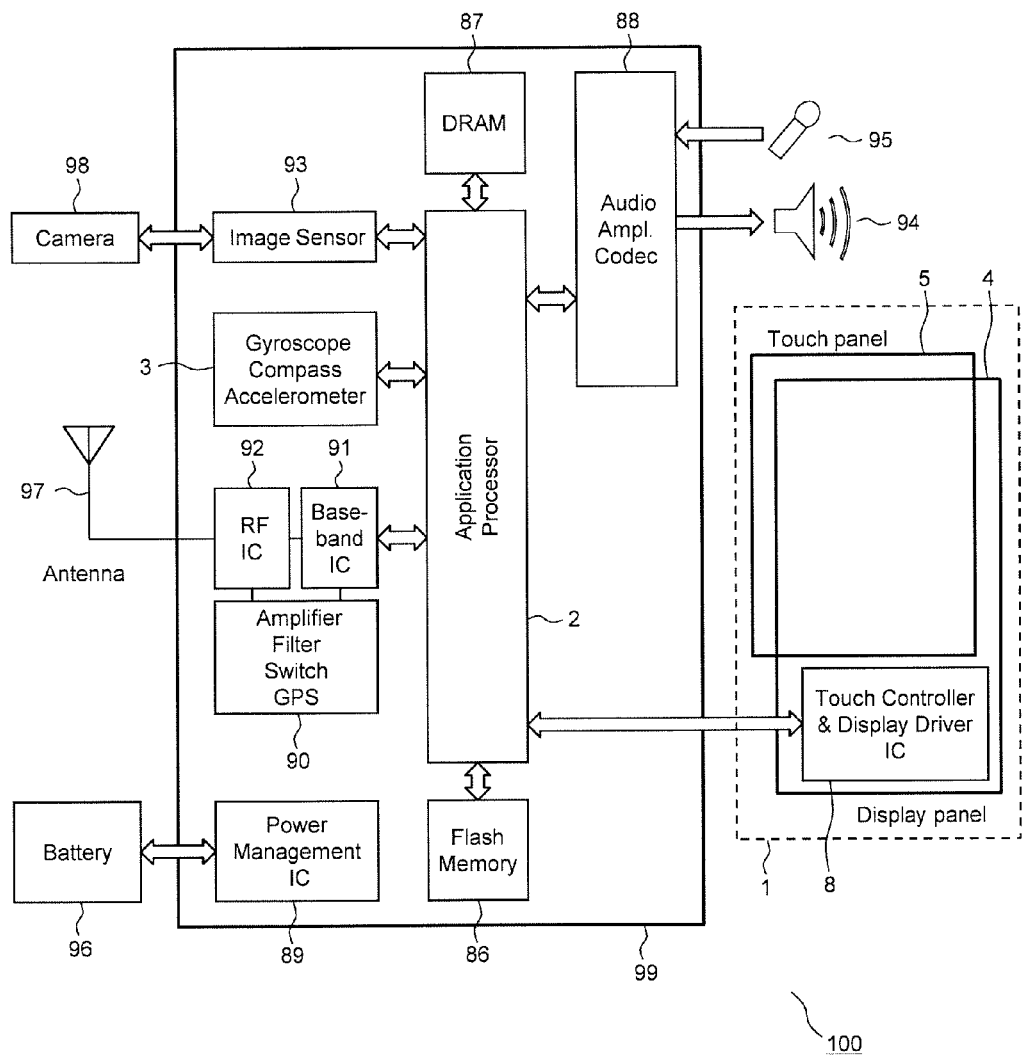
FIG. 2 is a block diagram showing an example of the configuration of the information technology device according to one embodiment of the invention.

FIG. 2 is a block diagram showing an example of the configuration of the information technology device 100 according to one embodiment of the invention. The information technology device 100 is e.g. a portable device such as a smart phone, which includes a display device 1, a main circuit board 99, microphone 95, a speaker 94, a camera 98 an antenna 97, a battery 96, etc. The display device 1 includes: a display panel 4; a touch panel 5; and a touch control IC 8 of one chip in which a touch controller serving to control the display panel and the touch panel and a display driver are formed. On the main circuit board 99, the application processor 2 and the tilt detector 3 for detecting the tilt are mounted. The application processor 2 is connected with the touch control IC 8 through e.g. a communication path of e.g. MIPI/DSI or I2C. On the main circuit board 99, a non-volatile memory 86 such as a flash memory (Registered Trademark) and a DRAM (Dynamic Random Access Memory) 87 are connected with the application processor 2; an application software program stored in the flash memory 86 is executed. Further, on the main circuit board 99, e.g. an audio processing circuit 88, an image processing circuit 93, an RF IC 92, a base band IC 91, an RF circuit 90, a power source control (Power Management) IC 89 are mounted. The audio processing circuit 88 includes an audio amplifier and an audio CODEC (Coding and DECoding). The audio processing circuit is connected with the microphone 95 and the speaker 94 and performs audio output and audio input. The image processing circuit 93 includes an image sensor or the like. The image processing circuit is connected with the camera 98, and captures digitizes a video image. The RF (Radio Frequency) circuit 90 includes: an RF amplifier, a filter, a switch, and a GPS (Global Positioning System), and performs wireless communications together with the RF IC 92 and the base band IC 91. The power-source-control IC 89 performs the voltage conversion of a power source supplied from the battery 96 connected therewith, such as raising/lowering the voltage thereof, or further stabilizes the power source and then, supplies it to various functional blocks in the information technology device 100.

Now, referring to FIG. 1 again, the example of the configuration of the display device 1 or the touch control IC 8 will be described further in detail. The display device 1 or the touch control IC 8 includes: a display driver circuit 10 for driving the display panel 4; a touch-line-scan circuit 20; a touch-state-detection circuit 30; a touch-detection-targeted-image-coordinate-designating register 12; a TX/RX coordinate-correspondence table 15; and a non-volatile memory (NVM) 16. The display device 1 or the touch control IC 8 may further include a CPU 26, an interface and a control logic circuit 25. Although no special restriction is intended, the touch control IC 8 is formed on a single substrate of a semiconductor such as silicon by use of e.g. the known CMOS (Complementary Metal-Oxide-Semiconductor field effect transistor) semiconductor manufacturing technique.

The display driver circuit 10 is a circuit capable of receiving a series of display data from the application processor 2 and displaying an image on the display panel 4 based on the received display data. The display driver circuit 10 in this embodiment includes a display-coordinate-conversion circuit 11, and is capable of rotating an image to be displayed based on parameters stored in the image-display-direction register 14. For instance, assuming that the information technology device 100 is a portable device such as a smart phone, the device displays entered display data at points which are rotated by 180 degrees from where to display them originally with a user holding the device upside down, whereas with a user holding the device while orienting it horizontally on the left or right, the device displays entered display data at points which are rotated by 90 degrees in a direction of the device oriented by the user.

The touch panel 5 includes touch-drive lines 22_1 to 22_m and touch-sense lines 32_1 to 32_n which intersect with one another (m and n are each a positive integer). The touch-line-scan circuit 20 includes: touch-drive circuits 21_1 to 21_m for driving the touch-drive lines 22_1 to 22_m respectively; a touch-drive-enable register 23; and a scan-pulse-generator circuit 24. The scan-pulse-generator circuit 24 supplies scan pulses to the touch-drive circuits 21_1 to 21_m. The touch-drive-enable register 23 performs control for stopping each of the touch-drive circuits 21_1 to 21_m from working. For instance, the touch-drive-enable register 23 includes registers TXEN1 to TXENm corresponding to the touch-drive circuits 21_1 to 21_m, and performs control for activating/stopping the touch-drive circuits 21_1 to 21_m independently according to values set on the registers.

The touch-state-detection circuit 30 includes: touch-sense circuits 31_1 to 31_n connected with the touch-sense lines 32_1 to 32_n respectively; a touch-sense enable register 33; a filter 34; an A/D converter 35; and a RAM (Random Access memory) 36. The touch-sense circuits 31_1 to 31_n sense changes in signals which arise on the respective touch-sense lines 32_1 to 32_n by means of capacitance changes resulting from the change in the distribution of electric force lines caused by a pressure which the touch panel 5 receives when being pressed or bringing a finger or the like into touch with or close to the touch panel 5. For instance, if the touch panel 5 is a capacitive type one, there is an inter-line capacitance at each point where the touch-drive lines 22_1 to 22_m and the touch-sense lines 32_1 to 32_n intersect with one another, and scan signals on the touch-drive lines 22_1 to 22_m propagate through the inter-line capacitances to the touch-sense lines 32_1 to 32_n. The inter-line capacitance involved with a touched portion is increased by pressing the touch panel 5 or touching a finger to the touch panel 5 and thus, the scan signals propagating to the touch-sense lines 32_1 to 32_n become large in amplitude. The touch-sense circuits 31_1 to 31_n amplify scan signals propagating through the touch-sense lines 32_1 to 32_n in amplitude, and output the signals. Outputs of the touch-sense circuits 31_1 to 31_n are passed through the filter 34, then input to the A/D converter 35, converted into digital values, and then written into the RAM 36. The CPU 26 reads out digitized values of the amplitudes of the scan signals having propagated through the touch-sense lines 32_1 to 32_n from the RAM 36 through the control logic circuit 25, calculates touch conditions of the touch panel 5, including a coordinate of a touch point, the number of touch points and additionally, and a change of a touch point, and sends them to the application processor 2 through the interface 27. The display device 1 may be arranged so that an access from the application processor 2 to the RAM 36 is enabled, and the application processor 2 can calculate the touch conditions of the touch panel 5 as described above. In that case, the CPU 26 is unnecessary, and the control logic circuit 25 is simplified. On the other hand, mounting CPU 26 on the display device 1 as described above, the load of an arithmetic calculation process on the application processor 2 can be lightened, and communication data between the display device 1 and the application processor 2 can be reduced in volume.

The touch-sense enable register 33 performs the control for stopping each of the touch-sense circuits 31_1 to 31_n from working. By the control by the touch-sense enable register 33 in combination with the control by the touch-drive-enable register 23 for stopping the touch-drive circuits 21_1 to 21_m from working, the actions by the touch-drive circuits 21_1 to 21_m to a region in the touch panel 5 on which no touch detection is required, and the actions by the touch-sense circuits 31_1 to 31_n to the region can be stopped. Thus, the power consumption of the display device 1 and that of the entire information technology device 100 can be kept low. For instance, the touch-sense enable register 33 includes registers RXEN1 to RXENn corresponding to the touch-sense circuits 31_1 to 31_n, and performs control for activating/stopping the touch-sense circuits 31_1 to 31_n independently according to values set on the registers.

Now, an example of the action of stopping the touch detection on part of regions of the touch panel 5 will be described.

Figure 3:
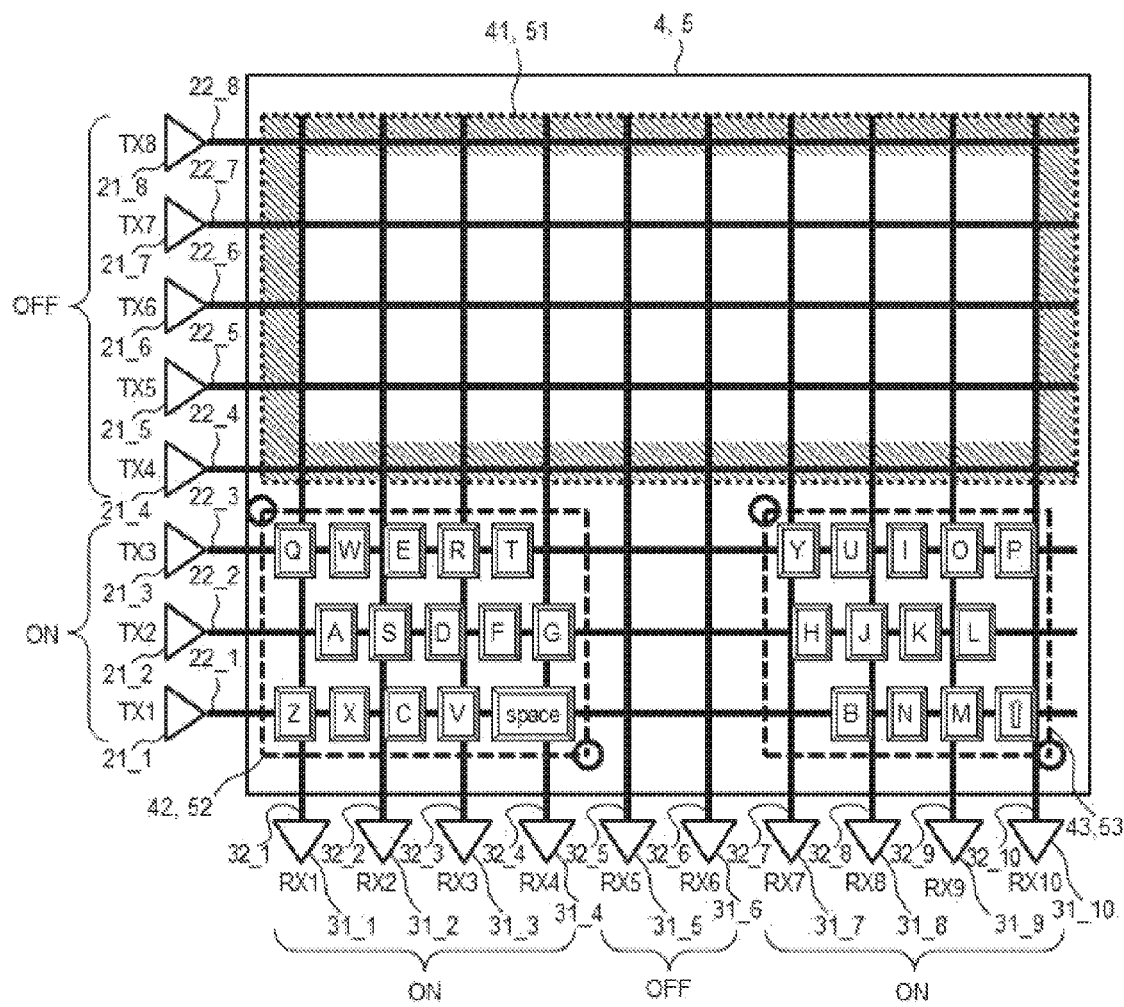
FIG. 3 is an explanatory diagram showing a touch-detection-stop region.
Figure 4:
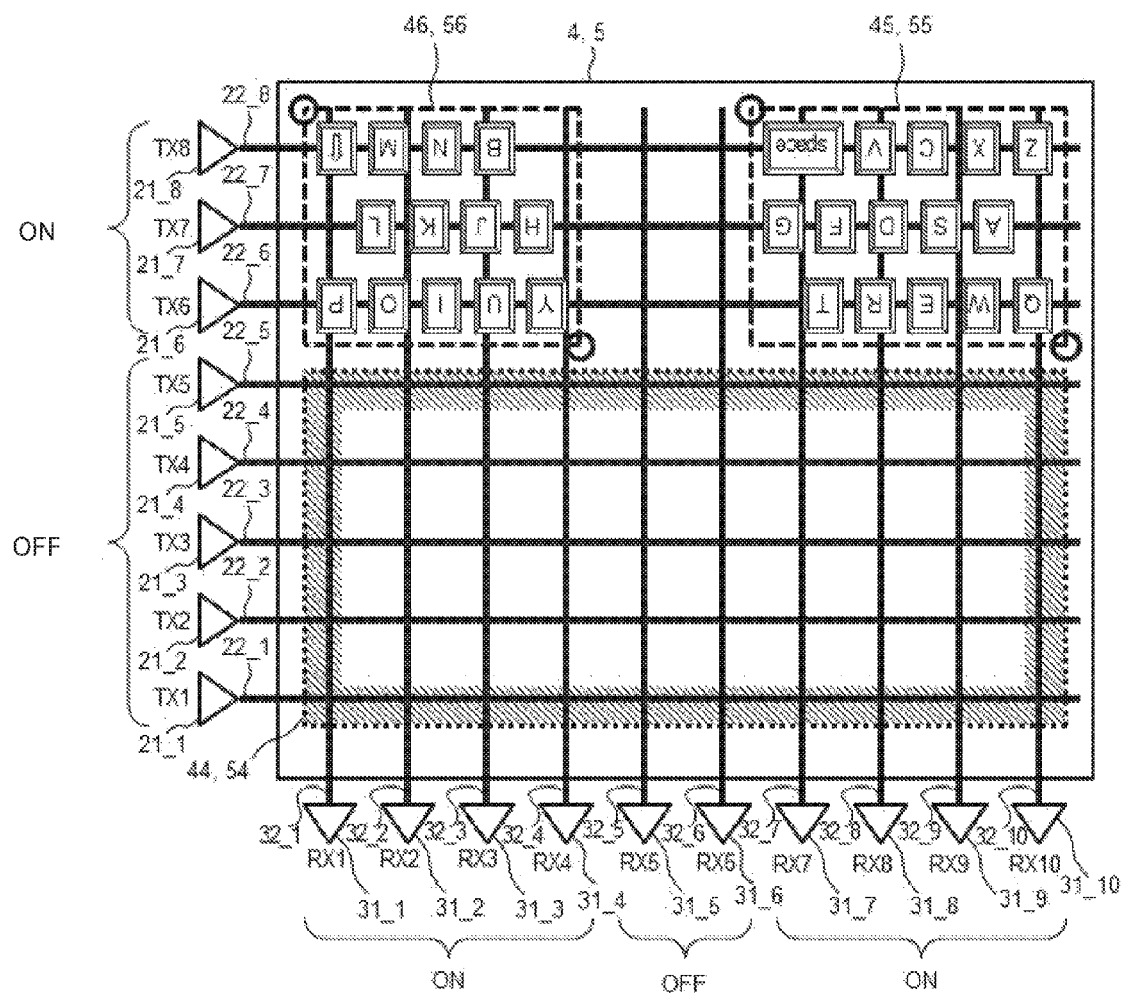
FIG. 4 is an explanatory diagram showing a touch-detection-stop region with an displayed-image orientation changed.
Figure 5:
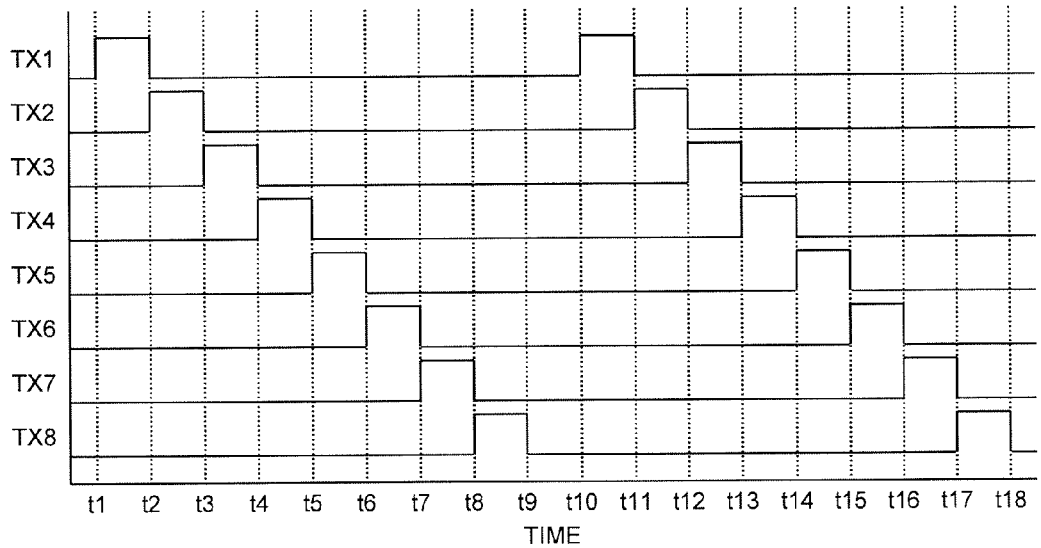
FIG. 5 is a waveform diagram showing a touch-drive action (full-screen scan) by the display device.
Figure 6:
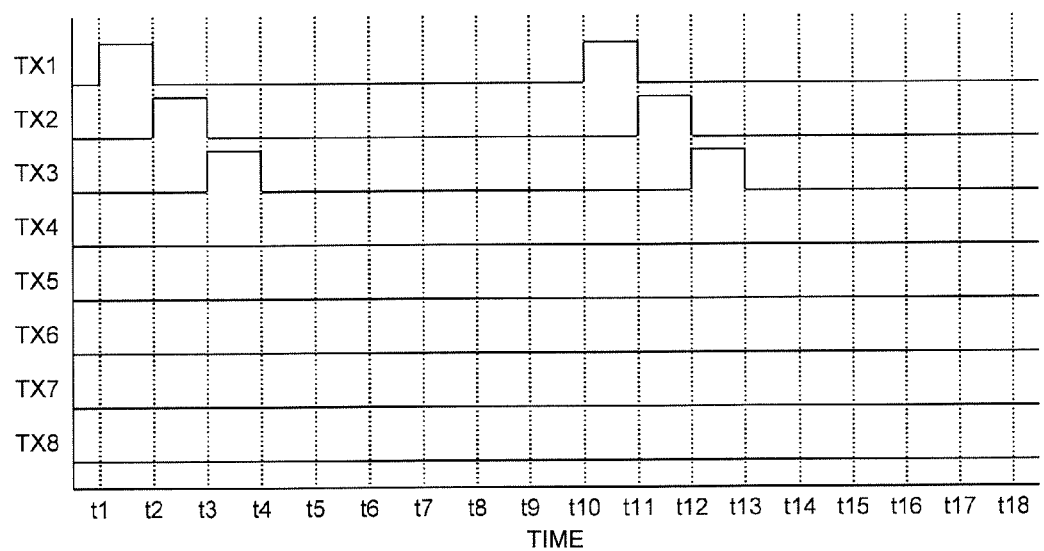
FIG. 6 is a waveform diagram showing a touch-drive action (partial scan) by the display device.
Figure 7:
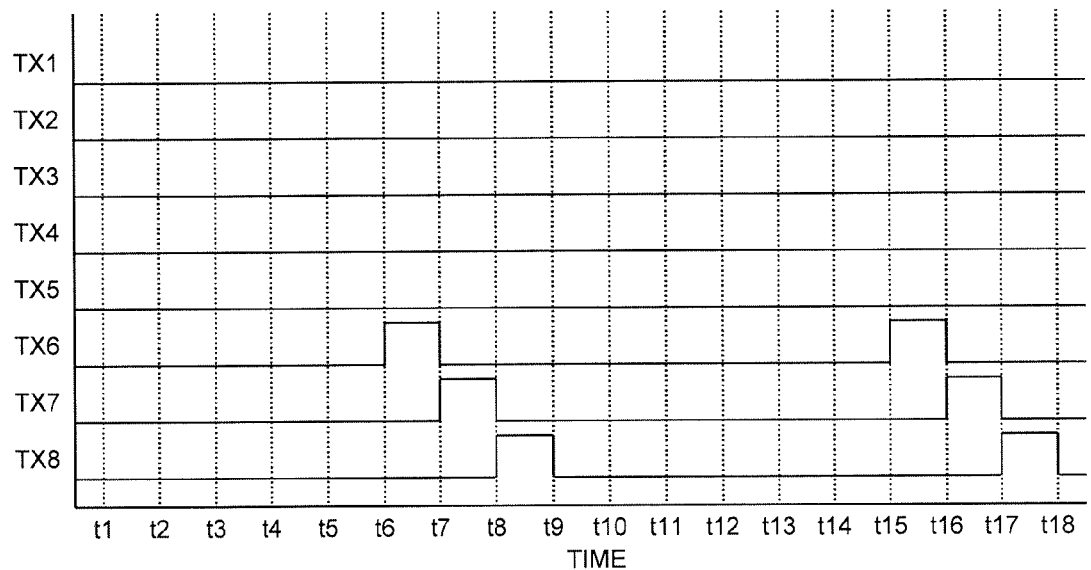
FIG. 7 is a waveform diagram showing a partial scan on condition that the image-display orientation on the display device has been changed.

FIGS. 3 and 4 are explanatory diagrams each showing a touch-detection-stop region; FIG. 4 is an explanatory diagram showing a touch-detection-stop region with the image-display orientation changed. FIGS. 5 to 7 are waveform diagrams each showing a touch-drive action (full-screen scan) of the display device; FIG. 5 shows a scan action in the case of scanning a full screen, FIG. 6 shows a scan action in the case of partially scanning a screen, and FIG. 7 shows a scan action in the case where the image-display orientation is changed and the touch-detection-stop region is changed.

FIG. 3 is an explanatory diagram showing touch-detection-stop regions, which shows an embodiment in which the display panel 4 and the touch panel 5 are laminated, and the display panel includes three display regions 41, 42 and 43. The display region 41 has e.g. some output information displayed therein; keyboards are displayed in the display regions 42 and 43 respectively. The touch panel 5 has the touch-drive lines 22_1 to 22_8, and the touch-sense lines 32_1 to 32_10. The touch-drive lines 22_1 to 22_8 are driven by the touch-drive circuits 21_1 to 21_8 respectively, and the touch-sense lines 32_1 to 32_10 are connected with the touch-sense circuits 31_1 to 31_10 respectively. The touch-drive circuits 21_1 to 21_8 are controlled in ON/OFF by the registers TXEN1 to TXEN8 (not shown) of the touch-drive-enable register 23, whereas the touch-sense circuits 31_1 to 31_10 are controlled in ON/OFF by the registers RXEN1 to RXEN10 (not shown) of the touch-sense enable register 33. In a case where information is just output in the display region 41, and no detection is required, the touch-detection-stop region 51 is designated corresponding to the display region 41, while the touch-detection-targeted regions 52 and 53 are designated corresponding to the display regions 42 and 43 where keyboards are displayed. The touch-detection-stop region 51 also includes a region between the display regions 42 and 43 on which there is not any image to display particularly. In this time, since the touch-drive circuits 21_1 to 21_3 serve to drive the touch-drive lines 22_1 to 22_3 on the touch-detection-targeted regions 52 and 53, the touch-drive circuits 21_1 to 21_3 are designated to be in ON state by the registers TXEN1 to TXEN3 of the touch-drive-enable register 23; the touch-drive circuits 21_4 to 21_8 serve to drive the touch-drive lines 22_4 to 22_8 on the touch-detection-stop region 51 and therefore, the touch-drive circuits 21_4 to 21_8 are designated to be in OFF state by the registers TXEN4 to TXEN8 of the touch-drive-enable register 23. The touch-sense circuits 31_1 to 31_4 and 31_7 to 31_10 connected with the touch-sense lines 32_1 to 32_4 and 32_7 to 32_10 on the touch-detection-targeted regions 52 and 53 are designated to be in ON state, and other touch-sense circuits 31_5 and 31_6 are designated to be in OFF state.

FIG. 5 and FIG. 6 are waveform diagrams each showing a touch-drive action (full-screen scan) of the display device; FIG. 6 is a waveform diagram showing a touch-drive action (partial scan) of the display device. In FIGS. 5 and 6, the horizontal axis represents time, and the vertical axis represents, in turn from the top, waveforms on the touch-drive lines 22_1 to 22_8, which are outputs of the touch-drive circuits 21_1 to 21_8 (TX1 to TX8). In the case of scanning a full screen with no touch-detection-stop region designated, the touch-drive circuits 21_1 to 21_8 (TX1 to TX8) output scan pulses to the touch-drive lines 22_1 to 22_8 at Time t1 and thereafter, at Time t2, t3, t4, t5, t6, t7, t8 in turn as shown in FIG. 5. At Time t10 to t17, the same action is performed. In the embodiment shown in FIG. 3 where the touch-detection-stop region is designated, the touch-drive circuits 21_1 to 21_3 are designated to be in ON state, and the circuits 21_4 to 21_8 are designated to be in OFF state. Therefore, the touch-drive circuits 21_1 to 21_3 output scan pulses to the touch-drive lines 22_1 to 22_3 only at Time t1 to t4 and Time t10 to t13 as shown in FIG. 6.

According to this embodiment, the display driver circuit 10 includes a display-coordinate-conversion circuit 11, and is capable of rotating an image to be displayed based on parameters stored in the image-display-direction register 14. In parallel with this, the touch-detection-stop region is also rotated and accordingly, values of registers TXEN1 to TXEN8 of the touch-drive-enable register 23 are updated. Now, an embodiment in which entered display data are displayed at points which are rotated by 180 degrees when a user holds the information technology device 100 which is a portable device such as a smart phone upside down will be described.

FIG. 4 is an explanatory diagram showing a touch-detection-stop region after the change of the image-display orientation. The display regions 41, 42 and 43 of FIG. 3 are rotated by 180 degrees and thus, converted into display regions 44, 45, 46 respectively. In parallel with this, the touch-detection-stop region 51 is converted into a touch-detection-stop region 54, and the touch-detection-targeted regions 52 and 53 are converted into touch-detection-targeted regions 55 and 56 respectively. Further, in parallel with this, the values of the registers TXEN1 to TXEN3 of the touch-drive-enable register 23 are changed from values designating ON to values designating OFF, and the values of the resisters TXEN6 to TXEN8 are changed from values designating OFF to values designating ON.

FIG. 7 is a waveform diagram showing a partial scan on condition that the image-display orientation of the display device 1 has been changed. As in FIGS. 5 and 6, the horizontal axis represents time, and the vertical axis represents, in turn from the top, waveforms on the touch-drive lines 22_1 to 22_8 which are outputs of the touch-drive circuits 21_1 to 21_8 (TX1 to TX8). The output of scan pulses output to the touch-drive lines 22_1 to 22_3 at Time t1 to t4 and Time t10 to t13 in the case of FIG. 6 has been stopped, and scan pulses are output to the touch-drive lines 22_6 to 22_8 at Time t7 to t9 and Time t15 to t18, instead.

While the above description has been presented focusing on the touch-drive-enable register 23, a like arrangement is made on the touch-sense enable register 33.

In case that the display region is rotated and changed in position, while the touch-detection-stop region does not follow the change, the problem that the touch detection action on a region to perform the touch detection on remains stopped in a display image after the rotation occurs. The problem can be solved by making a full screen a target for the touch detection action after the rotation. However, the effect of reducing the power consumption which is brought about by stopping the touch detection action cannot be retained, which becomes a problem. As shown in this embodiment, rotating the touch-detection-stop region and changing the settings of the touch-drive-enable register 23 and the touch-sense enable register 33 in line with the rotation of the display region, the effect of reducing the power consumption can be retained by stopping the touch detection action on an appropriate region even after the rotation of the display region.

On condition that the display region is rotated and changed, it has been required for the application processor 2 to reset a region to perform the touch detection on and the touch-detection-stop region in a display image after the rotation conventionally. In contrast, according to the invention, the touch control IC 8 autonomously rotates the touch-detection-stop region and changes the settings of the touch-drive-enable register 23 and the touch-sense enable register 33 in line with the rotation of the display region, which makes possible to eliminate the need for the reset by the application processor 2. As a result, it is sufficient for a display image creator to specify, on an application software, a touch-sense region and a touch-detection-stop region, etc. corresponding to an image, and such creator is not required to take into account the orientation of the device, and the physical connection between the touch control IC 8 and the display panel 4. This effect is achieved by the other embodiments in the same way.

<Intermittent Action of RX-Filter and ADC, and Optimization of CPU Operating Frequency>

In the display device 1 or the touch control IC 8 as described above, a filter circuit 34 connected with outputs of the touch-sense circuits 31_1 to 31_*n*, and an A/D converter 35 connected with an output of the filter circuit 34 can be intermittently activated based on values set on the touch-sense enable register 33. Further, the operating frequency of CPU 26 can be changed (lowered) based on values set on the touch-sense enable register 33. According to this embodiment, the power consumption can be suppressed further.

<TX/RX Enable Register, and Increase in TX Frequency>

Figure 8:
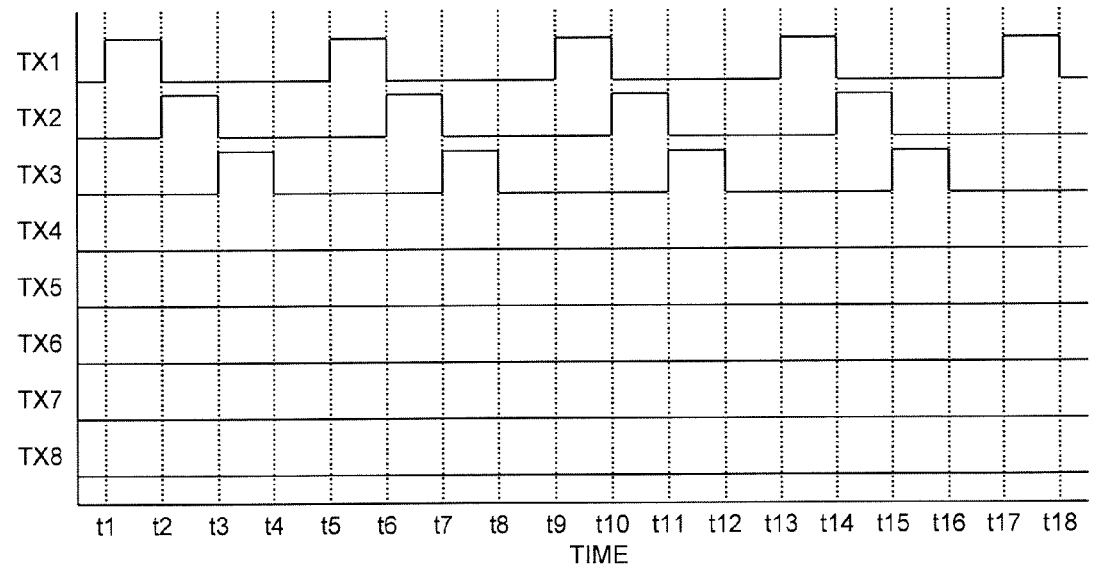
FIG. 8 is a waveform diagram showing a partial scan with the detection frequency increased.

Stopping two or more touch-drive circuits from working based on values set on the touch-sense enable register 33 in the display device 1 or the touch control IC 8 as described above, the frequency of activating the remaining touch-drive circuits can be increased. FIG. 8 is a waveform diagram showing a partial scan with the detection frequency increased. As in FIGS. 5, 6 and 7, the horizontal axis represents time, and the vertical axis represents, in turn from the top, waveforms on the touch-drive lines 22_1 to 22_8, which are outputs of the touch-drive circuits 21_1 to 21_8 (TX1 to TX8). In the case of FIG. 6, no scan pulse is output during the periods of Time t4 to t10 and Time t10 to t13 after the periods of Time t1 to t4 and Time t10 to t13 in which scan pulses are output to the touch-drive lines 22_1 to 22_3. In contrast, in the embodiment shown in FIG. 8, even after the period of Time t1 to t4 in which scan pulses are output to the touch-drive lines 22_1 to 22_3, scan pulses are output to the touch-drive lines 22_1 to 22_3 repeatedly in subsequent periods, such as Time t5 to t8, Time t9 to t12, and Time t13 to t17.

In this way, the frequencies of the touch drive and the touch sense can be increased on a region other than the touch-detection-stop region and therefore, the detection sensitivity on a region to perform a touch sense (touch detection) on except the touch-detection-stop region can be increased.

<TX/RX Coordinate-Correspondence Table>

Referring again to FIG. 1, the example of the configuration of the display device 1 or the touch control IC 8 will be described further in detail. The display device 1 or the touch control IC 8 has: the image-display-direction register 14; the conversion operation circuit 13; the touch-detection-targeted-image-coordinate-designating register 12; the TX/RX coordinate-correspondence table 15; and the non-volatile memory (NVM) 16. The application processor 2 writes, based on a result of detection by the tilt detector 3, parameters designating an image-display direction into the image-display-direction register 14. On condition that parameters stored in the image-display-direction register 14 have been changed, the display device 1 or the touch control IC 8 changes the touch-detection-stop region based on contents stored in the image-display-direction register 14.

The touch-detection-targeted-image-coordinate-designating register 12 is a register for designating a coordinate of an image targeted for touch detection of images on the display panel 4. The TX/RX coordinate-correspondence table 15 is a table for associating coordinates for an image on the display panel 4 with the layout of the touch-drive lines 22_1 to 22_m and the touch-sense lines 32_1 to 32_n.

Figure 9:
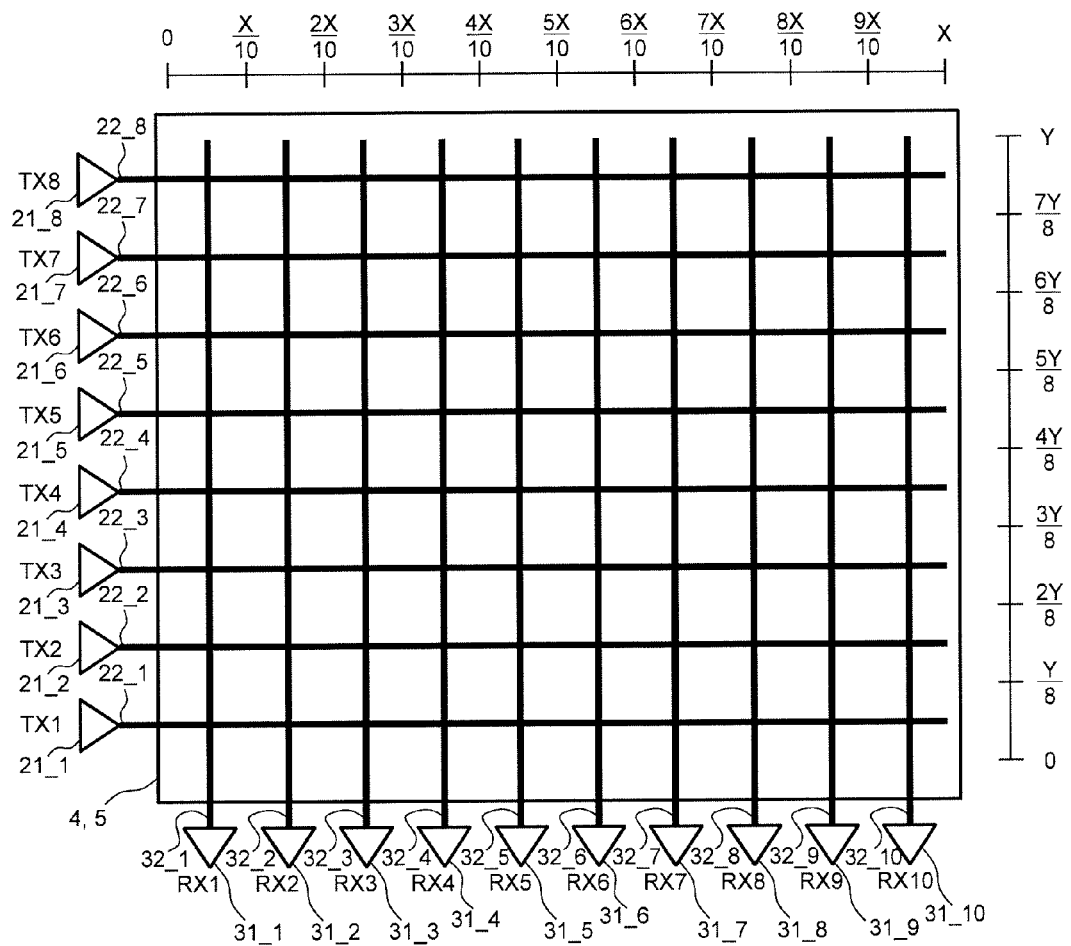
FIG. 9 is an explanatory diagram for explaining the correspondence between display coordinates and coordinates of the touch-drive/sense lines.

FIG. 9 is an explanatory diagram for explaining the correspondence between display coordinates and coordinates of the touch-drive/sense lines. The display panel 4 and the touch panel 5 which are laminated as in the case of FIGS. 3 and 4, the touch-drive lines 22_1 to 22_8, the touch-drive circuits 21_1 to 21_8, the touch-sense lines 32_1 to 32_10, and the touch-sense circuits 31_1 to 31_10 are shown in the diagram. Further, in the diagram, the coordinates of 0 to X are shown in an X direction, and the coordinates of 0 to Y are shown in a Y direction.

FIG. 10 is an explanatory diagram for explaining the TX/RX coordinate-correspondence table, in which a range of coordinates around the touch-drive lines 22_1 to 22_8 is shown for each of the touch-drive circuits 21_1 to 21_8 (TX1 to TX8). The range of coordinates corresponding to the touch-drive circuit 21_1 (TX1) is a range of 0 to Y/8-1. The ranges of coordinates corresponding to the subsequent touch-drive circuits 21_2 (TX2), 21_3 (TX3), 21_4 (TX4), 21_5 (TX5), 21_6 (TX6), 21_7 (TX7), and 21_8 (TX8) are Y/8 to 2Y/8-1, 2Y/8 to 3Y/8-1, 3Y/8 to 4Y/8-1, 4Y/8 to 5Y/8-1, 5Y/8 to 6Y/8-1, 6Y/8 to 7Y/8-1, and 7Y/8 to Y, respectively. Likewise, a range of coordinates around the touch-detection lines 32_1 to 32_10 is shown for each of the touch-sense circuits 31_1 to 31_10 (RX1 to RX10). The range of coordinates corresponding to the touch-sense circuits 31_1 (RX1) is a range of 0 to X/10-1. The ranges of coordinates corresponding to the subsequent touch-sense circuits 31_2 (RX2), 31_3 (RX3), 31_4 (RX4), 31_5 (RX5), 31_6 (RX6), 31_7 (RX7), 31_8 (RX8), 31_9 (RX9) and 31_10 (RX10) are X/10 to 2X/10-1, 2X/10 to 3X/10-1, 3X/10 to 4X/10-1, 4X/10 to 5X/10-1, 5X/10 to 6X/10-1, 6X/10 to 7X/10-1, 7X/10 to 8X/10-1, 8X/10 to 9X/10-1, and 9X/10 to X, respectively.

The table may be arranged to be stored in NVM 16. For instance, in the case of integrating, into one or more ICs, parts of the display device 1 other than the touch panel 5 and the display panel 4, it is possible to make flexible the combination of the one or more ICs, and the touch panel 5 and the display panel 4. This is because the correspondence between coordinates of image display, and the layout of the touch-drive lines 22_1 to 22_m and the touch-sense lines 32_1 to 32_n in the touch panel 5 and the display panel 4 can be written as the TX/RX coordinate-correspondence table 15 into NVM 16 after the product types and specifications of the touch panel 5 and the display panel 4 to be combined have been fixed. Instead of arranging the table which can be stored in NVM 16, the table may be arranged so that the table is previously stored in an on-system memory, e.g. the flash memory 86 as shown in FIG. 2, and stored in a register at the activation of the display driver circuit 10.

Second Embodiment

Touch-Detection-Target-Image-Coordinate-Designating Register

The touch-detection-targeted-image-coordinate-designating register 12 is a register for designating a coordinate of an image targeted for touch detection of images on the display panel 4. Each of the touch-detection-targeted regions 52 and 53 can be specified by e.g. coordinates of a start point and an end point.

FIG. 11 is a table for configuration of the touch-detection-targeted-image-coordinate-designating register, the image-data-region-designating register, and the image-display-direction register. In order to designate the touch-detection-targeted region, the display device 1 has, as the touch-detection-targeted-image-coordinate-designating register 12, more than one pair of a touch-detection-targeted-region-start-point-designating register TASX and a touch-detection-targeted-region-end-point-designating register TAEX. Since the display device 1 has the pairs of registers TASX and TAEX, more than one touch-detection-targeted region can be designated. Also, the display device 1 has, as the touch-detection-targeted-image-coordinate-designating register 12, more than one pair of an image-data-region-start-point-designating register IASX and an image-data-region-end-point-designating register IAEX. Since the display device 1 has the pairs of registers IASX and IAEX, more than one image data region can be designated. The image-display-direction register 14 includes: an image-data-display-direction-setting register DIRX for X-direction; and an imagedata-display-direction-setting register DIRY for Y-direction. The display device 1 further includes a power-saving-touch-mode-enable register PSTE. The settings of the other registers TASX, TAEX, TASY, TAEY, IASX, IAEX, IASY, and IAEY are made effective by making the setting on the power-saving-touch-mode-enable register PSTE, and then the action for achieving a lower power consumption is started.

Figure 12:
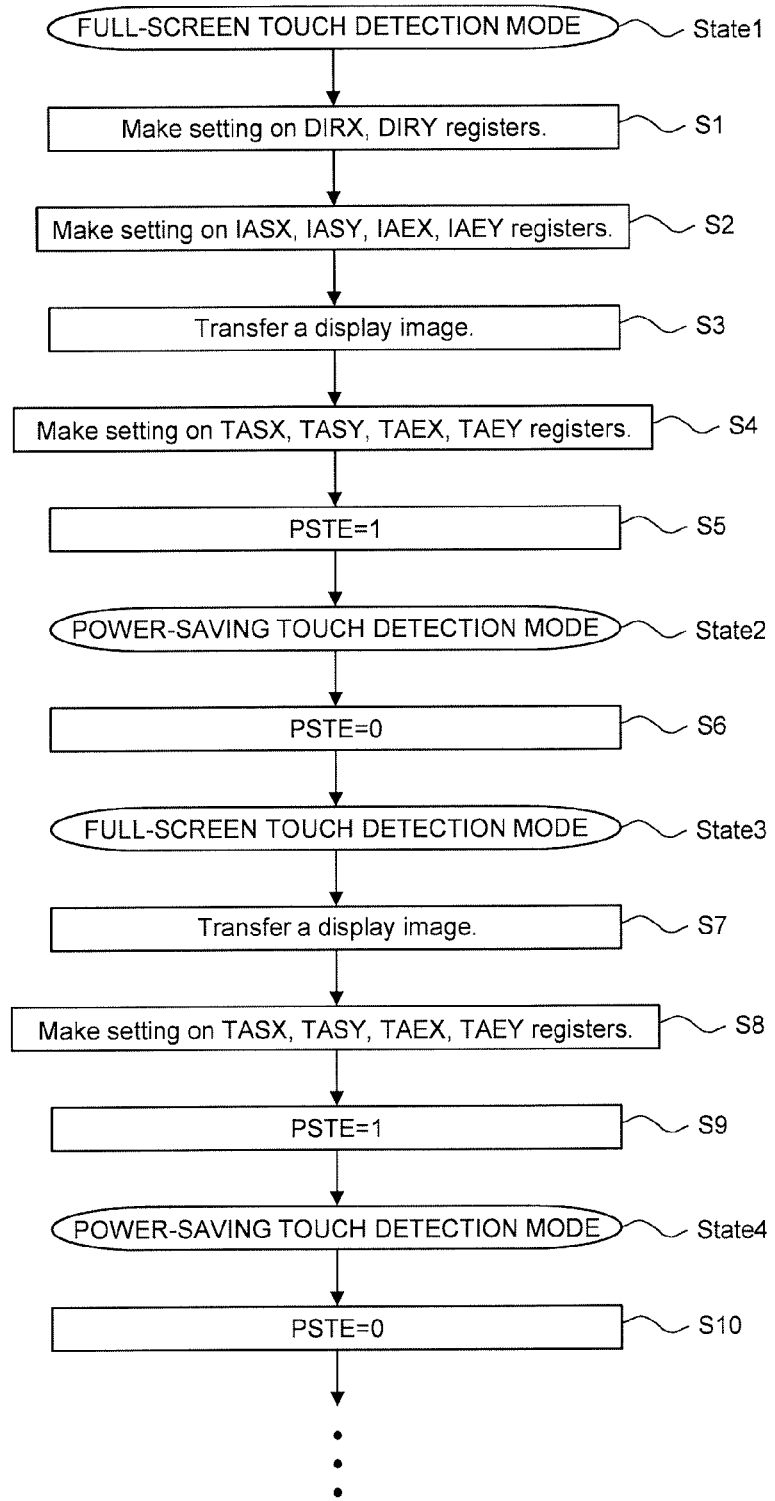
FIG. 12 is a flowchart showing an example for designating a touch-detection-stop region to cause the display device to perform a low-power-consumption operation.

FIG. 12 is a flow chart showing an example of an action for designating a touch-detection-stop region to cause the display device to perform a low-power-consumption action. First, the setting is performed on the image-data-display-direction-setting registers DIRX and DIRY with the display device 1 staying in a full-screen touch detection mode (State1) (S1). Next, the start and end points of an image data region are set on the image-data-region-start-point-designating register IASX and the image-data-region-end-point-designating register IAEX, and the image-data-region-start-point-designating register IASY and the image-data-region-end-point-designating register IAEY (S2), and then a display image is transferred (S3). Further, the setting is performed on the touch-detection-targeted-region-start-point-designating registers TASX and TASY, and the touch-detection-targeted-region-end-point-designating registers TAEX and TAEY (S4). After that, the setting of the power-saving-touch-mode-enable register PSTE is performed (S5) The above-described settings are made effective, whereby a power-saving touch detection mode is started (State2). In changing an image to be displayed, the power-saving-touch-mode-enable register PSTE is reset once, thereby bringing the display device back to the full-screen touch detection mode (State3). Then, a display image is transferred (S7), and the setting is performed on the touch-detection-targeted-region-start-point-designating registers TASX and TASY, and the touch-detection-targeted-region-end-point-designating registers TAEX and TAEY corresponding to the image (S8). After that, the setting is performed on the power-saving-touch-mode-enable register PSTE (S9), whereby the above-described new settings are made effective, and the power-saving touch detection mode is resumed (State4). Further, in changing an image to be displayed, the power-saving-touch-mode-enable register PSTE is reset again (S10), thereby bringing the display device back to the full-screen touch detection mode.

As described above, the touch-detection-targeted region can be designated by the coordinates of the start and end points of the region and therefore, the application processor 2 can designate the touch-detection-stop region with a small communication volume.

Third Embodiment

One-Chip Configuration of the Touch Controller and the Display Driver

Figure 13:
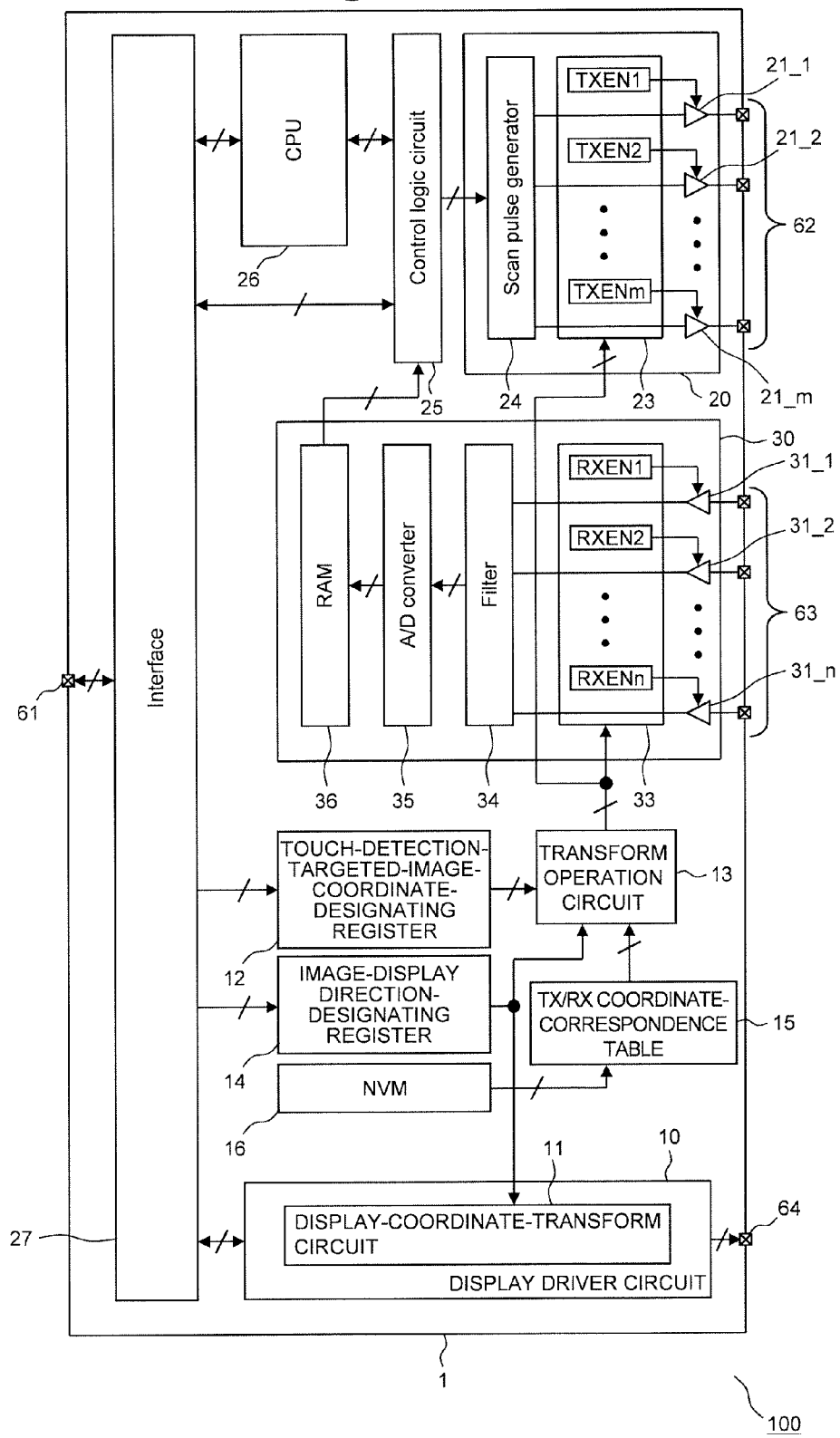
FIG. 13 is a block diagram showing a configuration of a touch control IC according to the third embodiment.

FIG. 13 is a block diagram showing a configuration of a touch control IC according to the third embodiment. The configuration is an example of the configuration of the touch control IC 8 arranged by integrating, into one chip, the touch controller and the display driver which control the display panel 4 and the touch panel 5 respectively as shown in FIG. 2. The touch control IC 8 is connected with the application processor 2 through a high-speed communication path compliant with MIPI/DSI or the like. The interface 27 interprets communication packets, distributes data to CPU 26, the control logic circuit 25, and the display driver circuit 10, and writes parameters into the touch-detection-targeted-image-coordinate-designating register 12 and the image-display-direction register 14. The touch control IC 8 has: a terminal 61 for connection with a path for communication with the application processor 2; terminals 62 for connection with the touch-drive lines 22; terminals 63 for connection with the touch-detection lines 32; and a terminal 64 for connection with the display panel 4. Other parts of the configuration are the same as those of the configuration of the display device 1 shown in FIG. 1 and therefore, the descriptions thereof are omitted to avoid the repetition thereof. For instance, the touch control IC 8 is flip chip mounted on a display-touch panel arranged by laminating the display panel 4 and the touch panel 5 together into an in-cell form. The mounting area can be suppressed by the integration into one chip like this.

Fourth Embodiment

The Touch Control IC and the Display Driver IC Arranged in Separate Chips

Figure 14:
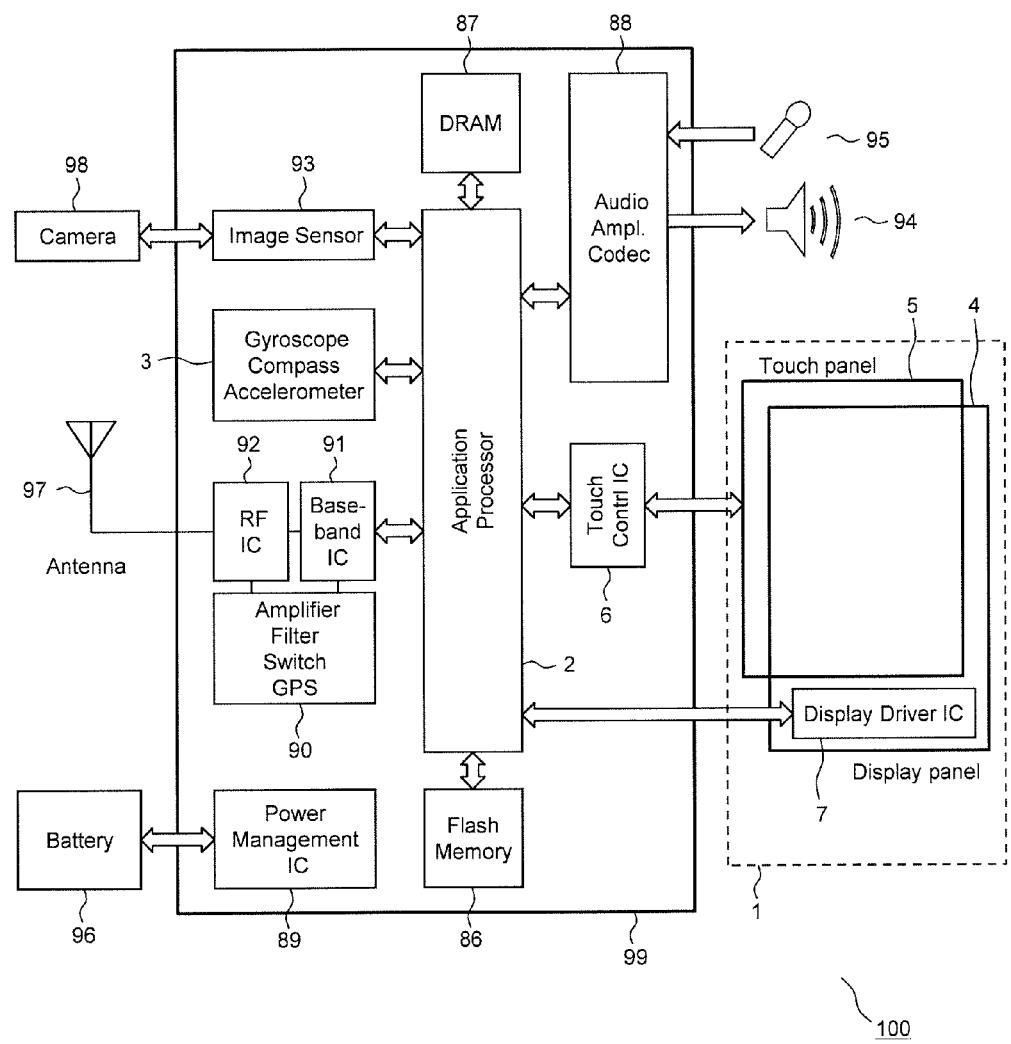
FIG. 14 is a block diagram showing an example of the configuration of the information technology device according to the fourth embodiment.

FIG. 14 is a block diagram showing an example of the configuration of the information technology device 100 according to the fourth embodiment. In the example, the touch control IC 6 and the display driver IC 7 are arranged in separate chips, the touch control IC 6 is mounted on a main substrate 99, and the display driver IC 7 is mounted on the display panel 4. Other parts of the configuration are the same as those of the configuration of the display device 1 shown in FIG. 2 and therefore, the descriptions thereof are omitted. While the embodiment in which the touch control IC 6 is mounted on the main substrate 99 is shown, it may be mounted on the touch panel 5 or the display panel 4 together with the display driver IC 7.

Figure 15:
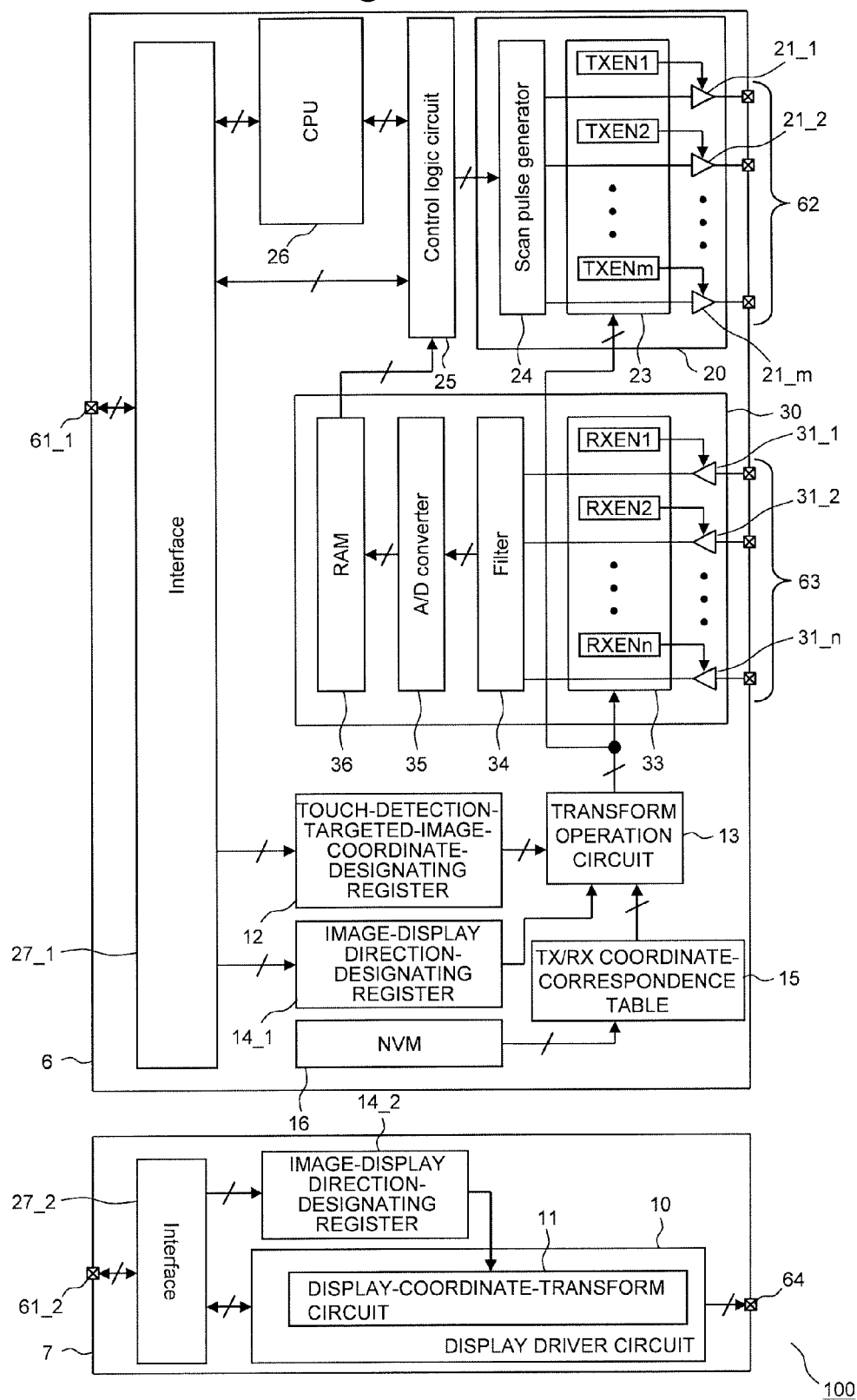
FIG. 15 is a block diagram showing an example of the configuration in which the touch control IC and the display driver IC are arranged in separate chips.

FIG. 15 is a block diagram showing an example of the configuration in which the touch control IC 6 and the display driver IC 7 are arranged in separate chips. For communication with the application processor 2, the touch control IC 6 has a terminal 61_1 and an interface 27_1, and the display driver IC 7 has a terminal 61_2 and an interface 27_2. Communication between the touch control IC 6 and the application processor 2 is realized by e.g. a communication path compliant with I2C on condition that a wide communication bandwidth is not required. Communication between the display driver IC 7 and the application processor 2 can be realized by e.g. a high-speed communication path compliant with MIPI/DSI on condition that a wide communication bandwidth is required for transfer of display data. Since the touch control IC 6 and the display driver IC 7 are arranged in separate chips, the touch control IC 6 and the display driver IC 7 have image-display-direction registers 14_1 and 14_2 respectively, which are equivalents for the image-display-direction register. Other parts of the touch control IC 6 and the display driver IC 7 are the same as those of the configuration of the display device 1 shown in FIG. 1 and therefore, the descriptions thereof are omitted.

On condition that the tilt detector 3 has sensed a change in the tilt, display coordinates of display data are converted by overwriting contents of the image-display-direction register and in parallel, the touch-detection-stop region is changed, and the settings on the touch-drive-enable register 23 and the touch-sense enable register 33 are changed as described in connection with the first embodiment. On condition that the tilt detector 3 has sensed a change in the tilt, the application processor 2 can appropriately change a touch detection region according to the change in the display direction by setting the same parameter on both of the image-display-direction register 14_1 in the touch control IC 6, and the image-display-direction register 14_2 in the display driver IC 7.

FIG. 16 is a block diagram showing an example of the configuration in which the touch control IC 6 and the display driver IC 7 are arranged in separate chips. In the example of the configuration shown in FIG. 15, the touch control IC 6 has the image-display-direction register 14; the conversion circuit 13; the touch-detection-targeted-image-coordinate-designating register 12; the TX/RX coordinate-correspondence table 15; and the non-volatile memory (NVM) 16. In contrast, in the example of the configuration shown in FIG. 16, they are included in the display driver IC 7. For communication with the application processor 2, the touch control IC 6 has a terminal 61_1 and an interface 27_3, and the display driver IC 7 has a terminal 61_2, and an interface 27_4. The touch control IC 6 is arranged to be able to write parameters into the touch-drive-enable register 23 and the touch-sense enable register 33 through the interface 27_3. The display driver IC 7 has an image-display-direction register 14, a conversion operation circuit 13, a touch-detection-targeted-image-coordinate-designating register 12, a TX/RX coordinate-correspondence table 15, and a non-volatile memory (NVM) 16, and is arranged to be able to write parameters into the image-display-direction register 14 and the touch-detection-targeted-image-coordinate-designating register 12 from the interface 27_4; an output (a result of the conversion) of the conversion operation circuit 13 can be output through the interface 27_4. Other parts of the touch control IC 6 and the display driver IC 7 are the same as those of the configuration of the display device 1 shown in FIG. 1 and therefore, the descriptions thereof are omitted.

On condition that the tilt detector 3 has sensed a change in the tilt, display coordinates of display data are converted by overwriting contents of the image-display-direction register 14 and in parallel, the coordinates of the touch-detection-stop region are changed as described in connection with the first embodiment. The conversion of display coordinates of display data is executed by the display-coordinate-conversion circuit 11 in the display driver circuit 10, and the results thereof is reflected on display of the display panel 4. On the other hand, coordinates of the touch-detection-stop region are converted by the conversion operation circuit 13, and sent to the application processor 2 through the interface 27_4. The application processor 2 calculates values to set on the touch-drive-enable register 23 and the touch-sense enable register 33 based on received values, and writes the calculated values into the touch-drive-enable register 23 and the touch-sense enable register 33 through the interface 27_3. According to this arrangement, it becomes possible to appropriately change the touch detection region according to the change in the display orientation.

Figure 17:
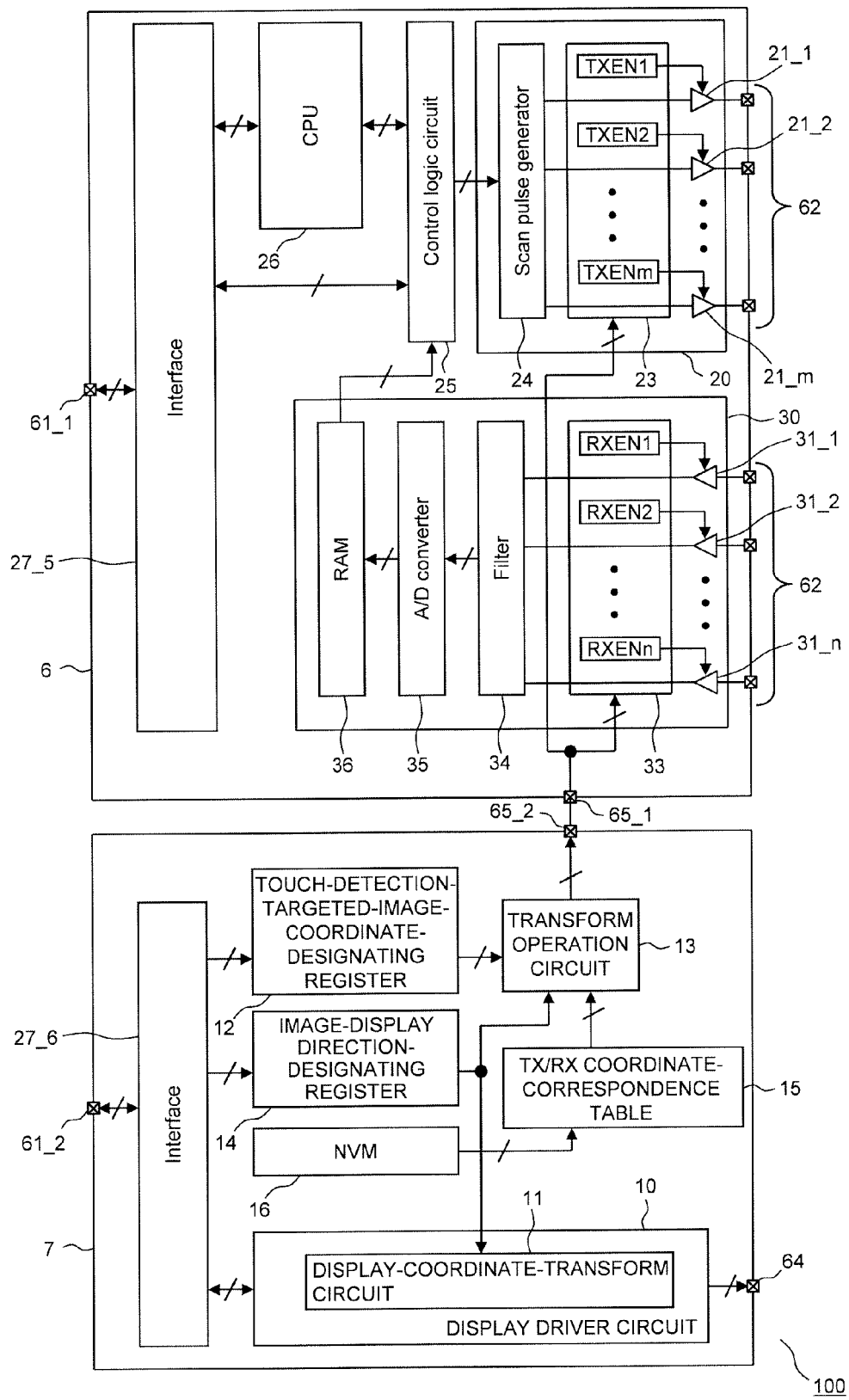
FIG. 17 is a block diagram showing still another example of the configuration in which the touch control IC and the display driver IC are arranged in separate chips.

FIG. 17 is a block diagram showing still another example of the configuration in which the touch control IC 6 and the display driver IC 7 are arranged in separate chips. In the example of the configuration shown in FIG. 16, coordinates of the touch-detection-stop region converted by the conversion operation circuit 13 are output to the application processor 2, and then the parameters calculated based on them are set on the touch-drive-enable register 23 and the touch-sense enable register 33. In the example of the configuration shown in FIG. 16, the display driver IC 7 is provided with a terminal 65_2 for outputting results of the conversion by the conversion operation circuit 13; the touch control IC 6 is provided with a terminal 65_1 for writing parameters into the touch-drive-enable register 23 and the touch-sense enable register 33. Other parts of the touch control IC 6 and the display driver IC 7 are the same as those of the display device 1 shown in FIG. 1 and therefore, the descriptions thereof are omitted to avoid the repetition thereof.

The information technology device is configured so as to be able to communicate, in which the terminal 65_1 and the terminal 65_2 are connected with each other, and a communication data format is decided previously. An interface circuit and a communication control terminal are added as needed. The touch control IC 6 and the display driver IC 7 are directly connected with each other and therefore, the load on the application processor 2 is never increased.

While the invention made by the inventor has been specifically described above based on the embodiments, the invention is not limited to the embodiments. It is obvious that various changes and modifications may be made without departing from the subject matter thereof.

While the description has been made taking, as an example, the case in which the tilt of the device is changed by 180 degrees, for example, the same applies to cases of changes by 90 degrees on the left and right, and an appropriate angle. The way to divide the functional blocks shown in the block diagrams is just one example. Also, the comparable circuit can be formed depending on the division of the other functional blocks.

What is claimed is:

1. A semiconductor integrated circuit device which can be incorporated in a display device incorporated in an information technology device including a processor to be connected with a tilt detector for detecting a tilt, and having a display panel and a touch panel superposed on the display panel, and which is arranged to touch operation on the touch panel has been performed, and arranged to be able to designate a touch-detection-stop region to stop the touch detection action in the touch panel, the semiconductor integrated circuit device, comprising:
an image-display-direction register arranged so that the processor can write parameters designating an image-display direction calculated based on a result of the detection by the tilt detector thereinto; and
a conversion operation circuit for changing the touch-detection-stop region based on contents stored in the image-display-direction register on condition that the parameters stored in the image-display-direction register have been changed,
wherein the touch panel includes a plurality of touch-drive lines, and a plurality of touch-sense lines intersecting with the plurality of touch-drive lines, the semiconductor integrated circuit device further comprising:
a plurality of touch-drive circuits for driving the plurality of touch-drive lines respectively;
a plurality of touch-sense circuits connected with the plurality of touch-sense lines respectively;
a touch-drive-enable register; and
a touch-sense enable register,
the semiconductor integrated circuit device, arranged to be able to perform control for individually stopping the plurality of touch-drive circuits from working based on respective values set on the touch-drive-enable register respectively, and arranged to be able to perform control for individually stopping the plurality of touch-sense circuits from working based on respective values set on the touch-sense enable register.

2. The semiconductor integrated circuit device according to claim 1, further comprising:
a coordinate-correspondence table for associating, with coordinates of an image to be displayed on the display panel, physical positions of the plurality of touch-drive lines and physical positions of the plurality of touch-sense lines respectively, wherein the conversion operation circuit makes reference to the coordinate-correspondence table, and performs setting on the touch-drive-enable register and the touch-sense enable register corresponding to the touch-detection-stop region.

3. The semiconductor integrated circuit device according to claim 2, further comprising: a non-volatile memory which can store the coordinate-correspondence table.

4. The semiconductor integrated circuit device according to claim 1, further comprising:
a filter circuit connected with outputs of the plurality of touch-sense circuits; and
an A/D converter connected with an output of the filter circuit,
the semiconductor integrated circuit device, arranged to be able to perform control for intermittently activating the filter circuit and the A/D converter based on values set on the touch-sense enable register.

5. The semiconductor integrated circuit device according to claim 4, further comprising:
a memory capable of storing an output of the A/D converter; and
a CPU connected with the memory to be able to make access thereto,
the semiconductor integrated circuit device, arranged to be able to perform control for changing the operating frequency of the CPU based on values set on the touch-sense enable register.

6. The semiconductor integrated circuit device according to claim 1, which is arranged so that while more than one touch-drive circuit is stopped from working based on values set on the touch-drive-enable register, control for increasing the frequency of activating the remaining touch-drive circuits can be performed.

7. A semiconductor integrated circuit device which can be incorporated in a display device incorporated in an information technology device including a processor to be connected with a tilt detector for detecting a tilt, and having a display panel and a touch panel superposed on the display panel, and which is arranged to be able to perform a touch detection action for sensing a region where a touch operation on the touch panel has been performed, and arranged to be able to designate a touch-detection-stop region to stop the touch detection action in the touch panel,
the semiconductor integrated circuit device, comprising:
an image-display-direction register arranged so that the processor can write parameters designating an image-display direction calculated based on a result of the detection by the tilt detector thereinto; and
a conversion operation circuit for changing the touch-detection-stop region based on contents stored in the image-display-direction register on condition that the parameters stored in the image-display-direction register have been changed,
which is arranged to receive a series of display data from the processor, and to display an image on the display panel based on the series of display data thus received, further comprising:
a display-coordinate-conversion circuit which changes, based on contents stored in the image-display-direction register, coordinates of an image to be displayed on the display panel on condition that the parameters stored in the image-display-direction register have been changed,
wherein the touch panel includes a plurality of touch-drive lines, and a plurality of touch-sense lines intersecting with the plurality of touch-drive lines, the semiconductor integrated circuit device further comprising:
a plurality of touch-drive circuits for driving the plurality of touch-drive lines respectively;
a plurality of touch-sense circuits connected with the plurality of touch-sense lines respectively;
a touch-drive-enable register; and
a touch-sense enable register,
the semiconductor integrated circuit device, arranged to be able to perform control for individually stopping the plurality of touch-drive circuits from working based on respective values set on the touch-drive-enable register respectively, and arranged to be able to perform control for individually stopping the plurality of touch-sense circuits from working based on respective values set on the touch-sense enable register.

8. The semiconductor integrated circuit device according to claim 7, further comprising:
a coordinate-correspondence table for associating, with coordinates of an image to be displayed on the display panel, physical positions of the plurality of touch-drive lines and physical positions of the plurality of touch-sense lines respectively,
wherein the conversion operation circuit makes reference to the coordinate-correspondence table, and performs setting on the touch-drive-enable register and the touch-sense enable register corresponding to the touch-detection-stop region.

9. The semiconductor integrated circuit device according to claim 8, further comprising: a non-volatile memory which can store the coordinate-correspondence table.

10. The semiconductor integrated circuit device according to claim 7, further comprising:
a filter circuit connected with outputs of the plurality of touch-sense circuits; and
an A/D converter connected with an output of the filter circuit,
the semiconductor integrated circuit device, arranged to be able to perform control for intermittently activating the filter circuit and the A/D converter based on values set on the touch-sense enable register.

11. The semiconductor integrated circuit device according to claim 10, further comprising:
a memory capable of storing an output of the A/D converter; and
a CPU connected with the memory to be able to make access thereto,
the semiconductor integrated circuit device, arranged to be able to perform control for changing the operating frequency of the CPU based on values set on the touch-sense enable register.

12. The semiconductor integrated circuit device according to claim 7, which is arranged so that while more than one touch-drive circuit is stopped from working based on values set on the touch-drive-enable register, control for increasing the frequency of activating the remaining touch-drive circuits can be performed.

13. A display device which can be incorporated in an information technology device including a processor to be connected with a tilt director for detecting a tilt, and has a display panel, and a touch panel superposed on the display panel, and which is arranged to be able to perform a touch detection action for sensing a region where a touch operation on the touch panel has been performed, and arranged to be able to designate a touch-detection-stop region to stop the touch detection action in the touch panel, the display device comprising:
an image-display-direction register arranged so that the processor based on a result of the detection by the tilt detector thereinto; and
a conversion operation circuit for changing the touch-detection-stop region based on contents stored in the image-display-direction register on condition that the parameters stored in the image-display-direction register have been changed,
wherein the touch panel includes a plurality of touch-drive lines, and a plurality of touch-sense lines intersecting with the plurality of touch-drive lines,
the display device has: a plurality of touch-drive circuits for driving the plurality of touch-drive lines respectively; a plurality of touch-sense circuits connected with the plurality of touch-sense lines respectively; a touch-drive-enable register; and a touch-sense enable register, and
the display device is arranged to be able to perform control for individually stopping the plurality of touch-drive circuits from working based on the touch-drive-enable register, and arranged to be able to perform control for individually stopping the plurality of touch-sense circuits from working based on the touch-sense enable register.

14. The display device according to claim 13, further comprising:
a coordinate-correspondence table for associating, with coordinates of an image to be displayed on the display panel, physical positions of the plurality of touch-drive lines and physical positions of the plurality of touch-sense lines respectively,
wherein the conversion operation circuit makes reference to the coordinate-correspondence table, and performs setting on the touch-drive-enable register and the touch-sense enable register corresponding to the touch-detection-stop region.

15. The display device according to claim 14, comprising: a non-volatile memory which can store the coordinate-correspondence table.

16. An information technology device comprising:
the display device as described in claim 15;
a tilt detector for detecting a tilt; and
a processor.

17. An information technology device comprising:
the display device as described in claim 14;
a tilt detector for detecting a tilt; and
a processor.

18. The display device according to claim 13, which is arranged so that while more than one touch-drive circuit is stopped from working based on values set on the touch-drive-enable register, control for increasing the frequency of activating the remaining touch-drive circuits can be performed.

19. An information technology device comprising:
the display device as described in claim 18;
a tilt detector for detecting a tilt; and
a processor.

20. An information technology device comprising:
the display device as described in claim 13;
a tilt detector for detecting a tilt; and
a processor.

21. A display device which can be incorporated in an information technology device including a processor to be connected with a tilt detector for detecting a tilt, and has a display panel, and a touch panel superposed on the display panel, and which is arranged to be able to perform a touch detection action for sensing a region where a touch operation on the touch panel has been performed, and arranged to be able to designate a touch-detection-stop region to stop the touch detection action in the touch panel,
the display device comprising:
an image-display-direction register arranged so that the processor can write parameters designating an image-display direction calculated based on a result of the detection by the tilt detector thereinto; and
a conversion operation circuit for changing the touch-detection-stop region based on contents stored in the image-display-direction register on condition that the parameters stored in the image-display-direction register have been changed, direction register have been changed,
which is arranged to be able to receive a series of display data from the processor, and to display an image on the display panel based on the series of display data thus received, further comprising:
a display-coordinate-conversion circuit which changes, based on contents stored in the image-display-direction register, coordinates of an image to be displayed on the display panel on condition that the parameters stored in the image-display-direction register have been changed,
wherein the touch panel includes a plurality of touch-drive lines, and a plurality of touch-sense lines intersecting with the plurality of touch-drive lines,
the display device has: a plurality of touch-drive circuits for driving the plurality of touch-drive lines respectively; a plurality of touch-sense circuits connected with the plurality of touch-sense lines respectively; a touch-drive-enable register; and a touch-sense enable register, and
the display device is arranged to be able to perform control for individually stopping the plurality of touch-drive circuits from working based on the touch-drive-enable register, and arranged to be able to perform control for individually stopping the plurality of touch-sense circuits from working based on the touch-sense enable register.

22. The display device according to claim 21, further comprising:
a coordinate-correspondence table for associating, with coordinates of an image to be displayed on the display panel, physical positions of the plurality of touch-drive lines and physical positions of the plurality of touch-sense lines respectively,
wherein the conversion operation circuit makes reference to the coordinate-correspondence table, and performs setting on the touch-drive-enable register and the touch-sense enable register corresponding to the touch-detection-stop region.

23. The display device according to claim 22, comprising: a non-volatile memory which can store the coordinate-correspondence table.

24. An information technology device comprising:
the display device as described in claim 23;
a tilt detector for detecting a tilt; and
a processor.

25. An information technology device comprising:
the display device as described in claim 22;
a tilt detector for detecting a tilt; and
a processor.

26. The display device according to claim 21, which is arranged so that while more than one touch-drive circuit is stopped from working based on values set on the touch-drive-enable register, control for increasing the frequency of activating the remaining touch-drive circuits can be performed.

27. An information technology device comprising:
the display device as described in claim 26;
a tilt detector for detecting a tilt; and
a processor.

28. An information technology device comprising:
the display device as described in claim 21;
a tilt detector for detecting a tilt; and
a processor.

29. An information technology device comprising:
a display device having a display panel and a touch panel provided thereon;
a tilt detector for detecting a tilt; and
a processor,
wherein the display device is arranged to be able to perform a touch detection action for sensing a region where a touch operation on the touch panel has been performed, and arranged to be able to designate a touch-detection-stop region to stop the touch detection action in the touch panel,
the display device includes an image-display-direction register,
the processor is arranged to be able to write parameters designating an image-display direction into the image-display-direction register based on a result of the detection by the tilt detector, and
the display device includes a conversion operation circuit for changing the touch-detection-stop region based on contents stored in the image-display-direction register on condition that the parameters stored in the image-display-direction register have been changed,
wherein the touch panel includes a plurality of touch-drive lines, and a plurality of touch-sense lines intersecting with the plurality of touch-drive lines, the semiconductor integrated circuit device further comprising:
a plurality of touch-drive circuits for driving the plurality of touch-drive lines respectively;
a plurality of touch-sense circuits connected with the plurality of touch-sense lines respectively;
a touch-drive-enable register; and
a touch-sense enable register,
the semiconductor integrated circuit device, arranged to be able to perform control for individually stopping the plurality of touch-drive circuits from working based on respective values set on the touch-drive-enable register respectively, and arranged to be able to perform control for individually stopping the plurality of touch-sense circuits from working based on respective values set on the touch-sense enable register.

* * * * *